United States Patent
Bosshart

(10) Patent No.: US 10,303,387 B2
(45) Date of Patent: *May 28, 2019

(54) CODING SCHEME FOR INDIRECT ADDRESSING OF MULTIPLE ACTION MEMORIES

(71) Applicant: Barefoot Networks, Inc., Santa Clara, CA (US)

(72) Inventor: Patrick Bosshart, Plano, TX (US)

(73) Assignee: BAREFOOT NETWORKS, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/898,162

(22) Filed: Feb. 15, 2018

(65) Prior Publication Data

US 2018/0239551 A1     Aug. 23, 2018

Related U.S. Application Data

(63) Continuation of application No. 14/968,844, filed on Dec. 14, 2015, now Pat. No. 9,910,615.
(Continued)

(51) Int. Cl.
*G06F 3/06* (2006.01)
*H04L 12/715* (2013.01)
(Continued)

(52) U.S. Cl.
CPC .......... *G06F 3/0635* (2013.01); *G06F 3/0604* (2013.01); *G06F 3/067* (2013.01);
(Continued)

(58) Field of Classification Search
CPC ....... H04L 45/38; H04L 49/25; H04L 49/109; H04L 49/70; H04L 12/721; G06F 3/0635;
(Continued)

(56) References Cited

U.S. PATENT DOCUMENTS

| 7,110,404 B1 | 9/2006 | Temoshenko |
| 8,885,475 B2 | 11/2014 | Sarwar et al. |

(Continued)

OTHER PUBLICATIONS

Non-Published commonly Owned U.S. Appl. No. 15/784,336, filed Oct. 16, 2017, 51 pages, Barefoot Networks, Inc.
(Continued)

*Primary Examiner* — Benjamin H Elliott, IV
(74) *Attorney, Agent, or Firm* — Adeli LLP

(57) ABSTRACT

Some embodiments provide a method for configuring unit memories to implement first and second sets of entries, the second set of which references the first set. The method configures a first pool of unit memories to implement the first set. Each entry in the first set is located at a particular location in at least one of the memories of the first pool. The method configures a second pool of unit memories to implement the second set. Each entry in the second set includes a particular number of bits for indicating (i) an initial first-pool unit memory at which the first-set entry referenced by the second-set entry is found and (ii) a number of subsequent first-pool memories across which the first-set entry is divided. A number of bits required to identify a single first-pool memory is one fewer than the particular number of bits.

15 Claims, 21 Drawing Sheets

Related U.S. Application Data

(60) Provisional application No. 62/119,786, filed on Feb. 23, 2015.

(51) Int. Cl.
  *G06F 13/28* (2006.01)
  *H04L 12/741* (2013.01)

(52) U.S. Cl.
  CPC .......... *G06F 3/0629* (2013.01); *G06F 3/0631* (2013.01); *G06F 3/0647* (2013.01); *G06F 3/0665* (2013.01); *G06F 3/0683* (2013.01); *G06F 13/28* (2013.01); *H04L 45/54* (2013.01); *H04L 45/64* (2013.01)

(58) Field of Classification Search
  CPC .... G06F 3/0604; G06F 3/0629; G06F 3/0631; G06F 3/0647; G06F 3/0365; G06F 3/067; G06F 3/0683
  See application file for complete search history.

(56) References Cited

U.S. PATENT DOCUMENTS

| | | | |
|---|---|---|---|
| 9,258,224 B2 | 2/2016 | Bosshart et al. | |
| 9,704,574 B1 | 7/2017 | Shamis | |
| 9,712,439 B2 | 7/2017 | Bosshart et al. | |
| 9,880,768 B2 | 1/2018 | Bosshart | |
| 9,910,615 B2 * | 3/2018 | Bosshart | G06F 3/0635 |
| 9,940,056 B2 * | 4/2018 | Bosshart | G06F 3/0635 |
| 10,009,276 B2 | 6/2018 | Bosshart et al. | |
| 10,078,463 B1 | 9/2018 | Bosshart | |
| 10,133,499 B2 | 11/2018 | Bosshart | |
| 2002/0019904 A1 | 2/2002 | Katz | |
| 2004/0032869 A1 | 2/2004 | Ambe et al. | |
| 2004/0160958 A1 | 8/2004 | Oh | |
| 2007/0110090 A1 | 5/2007 | Musoll et al. | |
| 2014/0105216 A1 | 4/2014 | McDysan et al. | |
| 2014/0241361 A1 | 8/2014 | Bosshart et al. | |
| 2014/0241362 A1 | 8/2014 | Bosshart et al. | |
| 2014/0286336 A1 | 9/2014 | Narayanan et al. | |
| 2015/0378633 A1 | 12/2015 | Sahita et al. | |
| 2016/0216913 A1 | 7/2016 | Bosshart | |
| 2016/0246507 A1 | 8/2016 | Bosshart | |
| 2016/0246532 A1 | 8/2016 | Bosshart | |
| 2016/0246535 A1 | 8/2016 | Bosshart | |
| 2016/0246541 A1 | 8/2016 | Bosshart | |
| 2016/0269287 A1 | 9/2016 | Li | |
| 2017/0126588 A1 | 5/2017 | Anand et al. | |
| 2018/0041615 A1 | 2/2018 | Bosshart et al. | |
| 2018/0173448 A1 * | 6/2018 | Bosshart | G06F 3/0635 |
| 2018/0191640 A1 | 7/2018 | Calderon et al. | |
| 2018/0239551 A1 * | 8/2018 | Bosshart | G06F 3/0635 |

OTHER PUBLICATIONS

Non-Published commonly Owned U.S. Appl. No. 15/898,172, filed Feb. 15, 2017, 72 pages, Barefoot Networks, Inc.

* cited by examiner

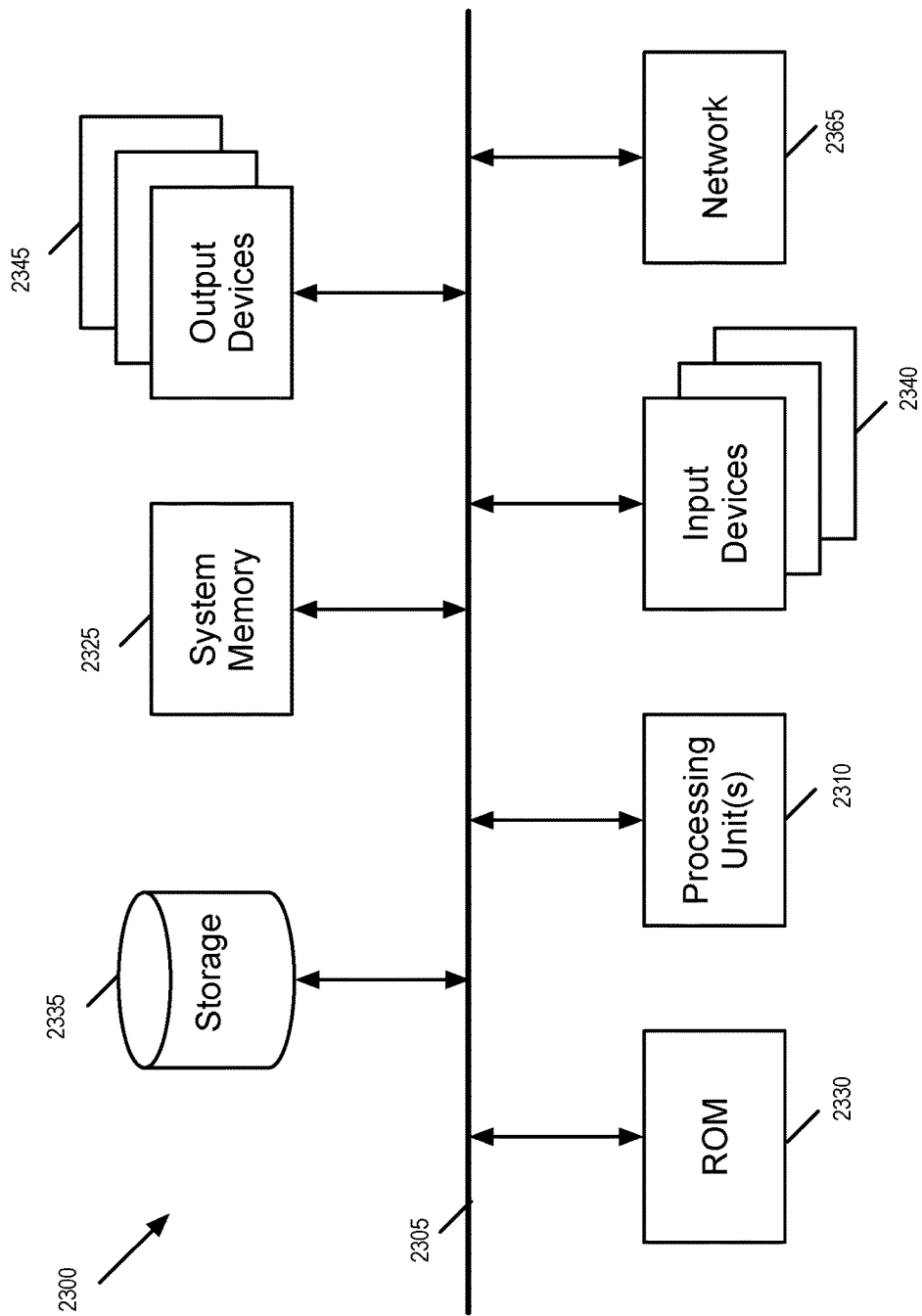

CODING SCHEME FOR INDIRECT ADDRESSING OF MULTIPLE ACTION MEMORIES

CLAIM OF BENEFIT TO PRIOR APPLICATION

This application is a continuation application of U.S. patent application Ser. No. 14/968,844, filed Dec. 14, 2015, now published as U.S. Patent Publication 2017/0063633, which claim benefit of U.S. Provisional Patent Application 62/119,786. U.S. Patent Publication 2017/0063633 is incorporated herein by reference.

BACKGROUND

Packet processing hardware may use a match-action paradigm (e.g., that specified by the OpenFlow standard) for packet forwarding (e.g., switching, routing, etc.). In some hardware implementations of an OpenFlow switch, memories (such as unit SRAMs) are used to store the match and action data that defines the flow entries. For optimal performance, the data stored on one SRAM should be easily moveable to another SRAM while the hardware switch operates, with minimal need for adjustments to the configuration of the data on the other SRAMs.

BRIEF SUMMARY

Some embodiments provide a method for configuring the unit memories (e.g., unit SRAMs) of a hardware forwarding element (e.g., a switching and/or routing element) to implement a match-action table for the forwarding element, while allowing for the movement of data from one unit memory to another during processing. Specifically, some embodiments assign virtual page numbers to sets of data stored in the memories, and use these virtual page numbers for addressing rather than page numbers that are fixed to the physical unit memories. This allows for data in a first unit memory referenced by data in a second unit memory to be moved to a third unit memory without any need to reconfigure the reference in the data stored in the second unit memory.

The hardware forwarding element of some embodiments processes network packets according to a series of match-action tables that specify when to perform certain operations on the packets. The match-action tables include match entries that specify sets of match conditions that can be met by packets, and corresponding action entries that specify operations to perform on packets that meet the match conditions. As an example, a match-action table might match on the destination MAC address of the packet, and specify an output port to which to send the packet. Different destination MAC addresses (i.e., different match entries) correspond to output actions to different ports (i.e., different action entries) of the forwarding element.

In some embodiments, the unit memories implement a match-action table by having a first set of the memories store the match entries and a second set of the memories store the action entries. That is, for a particular match entry and corresponding action entry, the match entry is stored in a first unit memory and the action entry is stored in a second unit memory. Some embodiments arrange the unit memories in a grid of rows and columns, with horizontal and vertical routing resources that connects the unit memories to arithmetic logic units (ALUs) that read the data from the unit memories in order to perform the match and action operations. In some such embodiments, a first pool of unit memories within a grid (e.g., a set of one or more columns of the grid) are utilized for the match entries, and a second pool of unit memories within the grid are utilized for the action entries. Some embodiments assign other functions of the forwarding element to unit memories within the grid as well, including statistics, meters, state, overhead (e.g., ternary indirection), etc. In some embodiments, the match memories are segregated (assigned to a specific set of columns, such as those closest to the ALUs) while the remaining memories in the grid are used for implementing memories for other functions (statistics, meters, etc.).

Each match entry of some embodiments include two portions: the set of match conditions for a packet to meet, and an address of the action entry to read when the set of match conditions are met by a packet. The address, in some embodiments, specifies both a memory page that indicates a unit memory within the grid of unit memories, and a location within that memory page. During the usage of the forwarding element, the sets of match and/or action entries that occupy a unit memory may be moved from one unit memory to another. That is, in order to optimize the memory usage for a particular stage of the processing pipeline, a set of action entries residing on a first unit memory could be moved to a second, different unit memory.

However, if the address stored by a match entry includes a reference to the first unit memory, then the data in this match entry (and all other match entries that reference action entries in the first unit memory would also need to be modified. Thus, the set of action entries stored on the first unit memory are assigned a virtual memory page number when the unit memories are initially configured. When the action entries are moved to the second unit memory, they retain this virtual memory page number. As such, the match entries that refer to these action entries need not be modified, as the address for each action entry stays the same (the individual action entries are kept in the same location within the new unit memory; i.e., the action entry located at location X in the first unit memory will now be located at location X in the second unit memory).

In some embodiments, some of the action entries are larger than the width of the unit memories. For instance, the unit SRAMs used might have a 128-bit width, which means that each location can store up to 128 bits. However, certain actions might require more than 128 bits to specify; tunnel encapsulations, for example, may require several times this amount of data. Accordingly, for the ALU to read the entire action entry in a single clock cycle, some embodiments divide the action entry across the same location in numerous different unit memories. In some embodiments, the several unit memories for a single action entry have different (e.g., subsequent) virtual page numbers. In other embodiments, however, several unit memories may share a single virtual page number. In such embodiments, all match entries specify a single virtual page number as part of their action entry address.

While a match entry could refer to an action entry spread across multiple unit memories each having a different page number by simply listing all of the virtual page numbers for the action entry, this could require a lot of data. For instance, if 7 bits are required for the virtual page number, then an action entry spread across four unit memories would require 28 bits just to specify these virtual page numbers (potentially in addition to several bits to specify the number of virtual page numbers across which the action entry is divided.

Instead, however, some embodiments use a coding scheme to specify the number of virtual memory pages across which an action entry is divided using only one more bit than that necessary to specify a single virtual memory.

The coding scheme of some embodiments specifies a number of least significant bits in the virtual page number that can be either 0 or 1 when reading the page number. Specifically, the coding scheme uses a number of 1s (or 0s) at the end of the page number to indicate the number of pages across which the action entry is divided. Thus, if the last bit (e.g., for a 7-bit address, the $8^{th}$ bit) is a 0, then the other bits will specify a single virtual page number for the action entry. If the last bit is a 1, then the next-to-last bit can be either 0 or 1, and the action entry is divided across at least two memory pages. Reading from the last bit, each bit that is a 1 (before reaching the first 0), as well as the first bit that is a 0, can be either a 0 or 1 in determining the virtual page numbers. Thus, three 1 bits followed by a 0 indicates that the referenced action entry is split across eight memory pages with virtual page addresses ranging from XXX . . . 000 to XXX . . . 111.

This limits the action entries to being divided across a number of unit memories that is a power of two (with the additional limitation that the first page number is a multiple of that factor of two), at considerable data savings. In addition, the virtual page numbers ensure that the four, eight, etc. unit memories used for an action entry need not be subsequent to each other in the grid, so long as the virtual page numbers are subsequent to each other.

For embodiments that allow only a single virtual page number for each action entry, some embodiments use an action entry address coding scheme that specifies (i) the virtual page number, (ii) a location (row) within the unit memory or memories to which that virtual page number maps, and, if required, a sub-location within that row. In some such embodiments, the action entry address includes a first set of bits to denote a virtual page number (which may map to one or more unit memories), a second set of bits to denote a row within virtual page (i.e., the same row within each unit memory, which are combined to form a single row for the virtual memory page), and a third set of bits that identifies both the length of the action entry within the row and the sub-location of that action entry.

For the third set of bits, some embodiments allocate a number of bits such that when all of the bits are 1, the action entry uses the entire length of the row. On the other hand, when the last bit is 0, the action entry will have a minimum width, and the remaining bits are used to specify at which sub-location within the row the entry is located. Some embodiments use a minimum width of a single bit, while other embodiments may use a minimum width of one byte or larger; the smaller the minimum action entry length, the larger the number of bits required to specify the sub-location (and thus the larger the third set of bits). The number of 1s starting from the last bit identifies the width of the entry within the row, using powers of 2; for instance, with a minimum width of 8 bits (when the last bit is 0), if the last four bits of the third set of bits are 0111, then the action entry will be 64-bits wide. In this case, for a 256-bit action memory row, two bits are required for the four possible sub-locations. Using this scheme, a fixed number of bits are required for a given row width and minimum entry size. As the number of trailing is (and thus the action entry length) increases, the number of bits needed to specify the sub-location decreases correspondingly.

In addition to using the virtual memory page addresses for the action entries, some embodiments use a similar scheme for the match entries as well. The above description refers to the case in which the match entry specifies the address of the action entry within its data. In some embodiments, however, the match entries (or at least some of the match entries) do not specify the address of the corresponding action entry, but instead use a direct addressing scheme in which the address of the match entry is used for the address of the action entry. That is, a match entry located at location X of unit match memory Y automatically references the action entry located at location X of unit action memory Y.

If only the action entries are moved from one unit memory to another, then this scenario only requires virtual memory page addresses for the sets of action entries. However, some embodiments also move the sets of match entries within the pool of unit memories designated as unit match memories. In this case, such embodiments assign virtual memory page addresses to the sets of match entries as well. Thus, when a set of match entries designated as virtual memory page X moves from a first unit memory to a second unit memory, they still reference the same set of action entries.

In some embodiments, the match entries may be small enough such that multiple entries fit within a single location of one of the unit memories. For example, a standard MAC address uses 48 bits, and thus two such addresses can fit within a 128-bit memory location (so long as the overhead is not too large). Packing multiple match entries per unit memory location is significantly easier using the direct addressing scheme, in which additional bits need not be allocated per match entry to the corresponding action entry address. However, for the indirect addressing scheme to work, some embodiments assign multiple virtual memory page addresses to each unit memory. In the example of 48-bit MAC addresses, the first half of all of the locations in the unit memory are part of a first virtual memory page and the second half of all of the locations in the unit memory are part of a second virtual memory page.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 23 conceptually illustrates an electronic system with which some embodiments of the invention are implemented.

DETAILED DESCRIPTION

Figure 1:
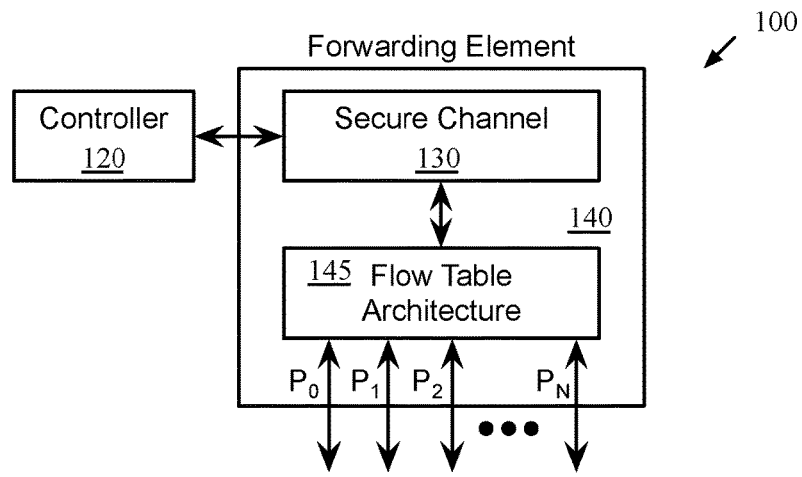
FIG. 1 conceptually illustrates a match-action packet processing system of some embodiments that uses a match-action format to process packets.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for configuring the unit memories (e.g., unit SRAMs) of a hardware forwarding element (e.g., a switching and/or routing element) to implement a match-action table for the forwarding element, while allowing for the movement of data from one unit memory to another during processing. Specifically, some embodiments assign virtual page numbers to sets of data stored in the memories, and use these virtual page numbers for addressing rather than page numbers that are fixed to the physical unit memories. This allows for data in a first unit memory referenced by data in a second unit memory to be moved to a third unit memory without any need to reconfigure the reference in the data stored in the second unit memory.

The hardware forwarding element of some embodiments processes network packets according to a series of match-action tables that specify when to perform certain operations on the packets. The match-action tables include match entries that specify sets of match conditions that can be met by packets, and corresponding action entries that specify operations to perform on packets that meet the match conditions. As an example, a match-action table might match on the destination MAC address of the packet, and specify an output port to which to send the packet. Different destination MAC addresses (i.e., different match entries) correspond to output actions to different ports (i.e., different action entries) of the forwarding element.

In some embodiments, the unit memories implement a match-action table by having a first set of the memories store the match entries and a second set of the memories store the action entries. That is, for a particular match entry and corresponding action entry, the match entry is stored in a first unit memory and the action entry is stored in a second unit memory. Some embodiments arrange the unit memories in a grid of rows and columns, with horizontal and vertical routing resources that connects the unit memories to arithmetic logic units (ALUs) that read the data from the unit memories in order to perform the match and action operations. In some such embodiments, a first pool of unit memories within a grid (e.g., a set of one or more columns of the grid) are utilized for the match entries, and a second pool of unit memories within the grid are utilized for the action entries. Some embodiments assign other functions of the forwarding element to unit memories within the grid as well, including statistics, meters, state, overhead (e.g., ternary indirection), etc. In some embodiments, the match memories are segregated (assigned to a specific set of columns, such as those closest to the ALUs) while the remaining memories in the grid are used for implementing memories for other functions (statistics, meters, etc.).

Each match entry of some embodiments include two portions: the set of match conditions for a packet to meet, and an address of the action entry to read when the set of match conditions are met by a packet. The address, in some embodiments, specifies both a memory page that indicates a unit memory within the grid of unit memories, and a location within that memory page. During the usage of the forwarding element, the sets of match and/or action entries that occupy a unit memory may be moved from one unit memory to another. That is, in order to optimize the memory usage for a particular stage of the processing pipeline, a set of action entries residing on a first unit memory could be moved to a second, different unit memory.

However, if the address stored by a match entry includes a reference to the first unit memory, then the data in this match entry (and all other match entries that reference action entries in the first unit memory would also need to be modified. Thus, the set of action entries stored on the first unit memory are assigned a virtual memory page number when the unit memories are initially configured. When the action entries are moved to the second unit memory, they retain this virtual memory page number. As such, the match entries that refer to these action entries need not be modified, as the address for each action entry stays the same (the individual action entries are kept in the same location within the new unit memory; i.e., the action entry located at location X in the first unit memory will now be located at location X in the second unit memory).

In some embodiments, some of the action entries are larger than the width of the unit memories. For instance, the unit SRAMs used might have a 128-bit width, which means that each location can store up to 128 bits. However, certain actions might require more than 128 bits to specify; tunnel encapsulations, for example, may require several times this amount of data. Accordingly, for the ALU to read the entire action entry in a single clock cycle, some embodiments divide the action entry across the same location in numerous different unit memories. In some embodiments, the several unit memories for a single action entry have different (e.g., subsequent) virtual page numbers. In other embodiments, however, several unit memories may share a single virtual page number. In such embodiments, all match entries specify a single virtual page number as part of their action entry address.

While a match entry could refer to an action entry spread across multiple unit memories each having a different page number by simply listing all of the virtual page numbers for the action entry, this could require a lot of data. For instance, if 7 bits are required for the virtual page number, then an action entry spread across four unit memories would require 28 bits just to specify these virtual page numbers (potentially in addition to several bits to specify the number of virtual page numbers across which the action entry is divided.

Instead, however, some embodiments use a coding scheme to specify the number of virtual memory pages across which an action entry is divided using only one more bit than that necessary to specify a single virtual memory. The coding scheme of some embodiments specifies a number of least significant bits in the virtual page number that can be either 0 or 1 when reading the page number. Specifically, the coding scheme uses a number of 1s (or 0s) at the end of the page number to indicate the number of pages across which the action entry is divided. Thus, if the last bit (e.g., for a 7-bit address, the $8^{th}$ bit) is a 0, then the other bits will specify a single virtual page number for the action entry. If the last bit is a 1, then the next-to-last bit can be either 0 or 1, and the action entry is divided across at least two memory pages. Reading from the last bit, each bit that is a 1 (before reaching the first 0), as well as the first bit that is a 0, can be either a 0 or 1 in determining the virtual page numbers. Thus, three 1 bits followed by a 0 indicates that the referenced action entry is split across eight memory pages with virtual page addresses ranging from XXX . . . 000 to XXX . . . 111.

This limits the action entries to being divided across a number of unit memories that is a power of two (with the additional limitation that the first page number is a multiple of that factor of two), at considerable data savings. In addition, the virtual page numbers ensure that the four, eight, etc. unit memories used for an action entry need not be subsequent to each other in the grid, so long as the virtual page numbers are subsequent to each other.

For embodiments that allow only a single virtual page number for each action entry, some embodiments use an action entry address coding scheme that specifies (i) the virtual page number, (ii) a location (row) within the unit memory or memories to which that virtual page number maps, and, if required, a sub-location within that row. In some such embodiments, the action entry address includes a first set of bits to denote a virtual page number (which may map to one or more unit memories), a second set of bits to denote a row within virtual page (i.e., the same row within each unit memory, which are combined to form a single row for the virtual memory page), and a third set of bits that identifies both the length of the action entry within the row and the sub-location of that action entry.

For the third set of bits, some embodiments allocate a number of bits such that when all of the bits are 1, the action entry uses the entire length of the row. On the other hand, when the last bit is 0, the action entry will have a minimum width, and the remaining bits are used to specify at which sub-location within the row the entry is located. Some embodiments use a minimum width of a single bit, while other embodiments may use a minimum width of 1 bit; the smaller the minimum action entry length, the larger the number of bits required to specify the sub-location (and thus the larger the third set of bits). The number of 1s starting from the last bit identifies the width of the entry within the row, using powers of 2; for instance, with a minimum width of 8 bits (when the last bit is 0), if the last four bits of the third set of bits are 0111, then the action entry will be 64-bits wide. In this case, for a 256-bit action memory row, two bits are required for the four possible sub-locations. Using this scheme, a fixed number of bits are required for a given row width and minimum entry size. As the number of trailing 1s (and thus the action entry length) increases, the number of bits needed to specify the sub-location decreases correspondingly.

In addition to using the virtual memory page addresses for the action entries, some embodiments use a similar scheme for the match entries as well. The above description refers to the case in which the match entry specifies the address of the action entry within its data. In some embodiments, however, the match entries (or at least some of the match entries) do not specify the address of the corresponding action entry, but instead use a direct addressing scheme in which the address of the match entry is used for the address of the action entry. That is, a match entry located at location X of unit match memory Y automatically references the action entry located at location X of unit action memory Y.

If only the action entries are moved from one unit memory to another, then this scenario only requires virtual memory page addresses for the sets of action entries. However, some embodiments also move the sets of match entries within the pool of unit memories designated as unit match memories. In this case, such embodiments assign virtual memory page addresses to the sets of match entries as well. Thus, when a set of match entries designated as virtual memory page X move from a first unit memory to a second unit memory, they still reference the same set of action entries.

In some embodiments, the match entries may be small enough such that multiple entries fit within a single location of one of the unit memories. For example, a standard MAC address uses 48 bits, and thus two such addresses can fit within a 128-bit memory location (so long as the overhead is not too large). Packing multiple match entries per unit memory location is significantly easier using the direct addressing scheme, in which additional bits need not be allocated per match entry to the corresponding action entry address. However, for the indirect addressing scheme to work, some embodiments assign multiple virtual memory page addresses to each unit memory. In the example of 48-bit MAC addresses, the first half of all of the locations in the unit memory are part of a first virtual memory page and the second half of all of the locations in the unit memory are part of a second virtual memory page.

Many more details of the forwarding element of some embodiments will be described in the sections below. Section I introduces the general packet forwarding architecture of some embodiments. Section II then describes in detail the virtual memory page addressing for action entries, while Section III describes virtual memory page addressing for match entries. Finally, Section IV describes an electronic system with which some embodiments of the invention are implemented.

I. Packet Forwarding Architecture

Before discussing the movement of match and action entries from one unit memory to another, the match-action packet forwarding architecture of some embodiments will be described. FIG. 1 conceptually illustrates a match-action packet processing system 100 of some embodiments that uses a match-action format to process packets. For example, in some embodiments, the packet processing system 100 uses the OpenFlow protocol. As shown, the packet processing system 100 includes a controller 120 and a forwarding element 140 (e.g., a switch, router, or combination thereof), with a messaging protocol between the two that uses secure channel 130. In some embodiments, the controller 120 communicates with numerous such forwarding elements (e.g., using OpenFlow or a similar protocol) in a network in order to configure the different forwarding elements to operate as needed within the network. Each of the forwarding elements configured by the controller 120 is the same as the forwarding element 140 in high-level structure, though in some embodiments the various forwarding elements may have different hardware structures, or could even be software forwarding elements.

The forwarding element 140 of some embodiments processes network packets according to one or more match-action tables, also referred to as flow tables, that are part of the flow table architecture 145 of the forwarding element. The flow tables include flow entries with (i) match conditions that are compared to the headers of the packets and (ii) actions to take if a packet meets the corresponding match conditions. As discussed in greater detail below, the flow table architecture 145 includes various memories (e.g., unit SRAMs, TCAMs, etc.) that store the flow table data, as well as logic units (e.g., ALUs) and other supporting circuitry.

The forwarding element 140 also includes a number of ports $P_0$-$P_N$, through which various elements in the network connect to the forwarding element. These elements could be host machines hosting virtual machines (VMs), physical computers, or other forwarding elements (that connect to the forwarding element 140 through tunnels).

Figure 2:
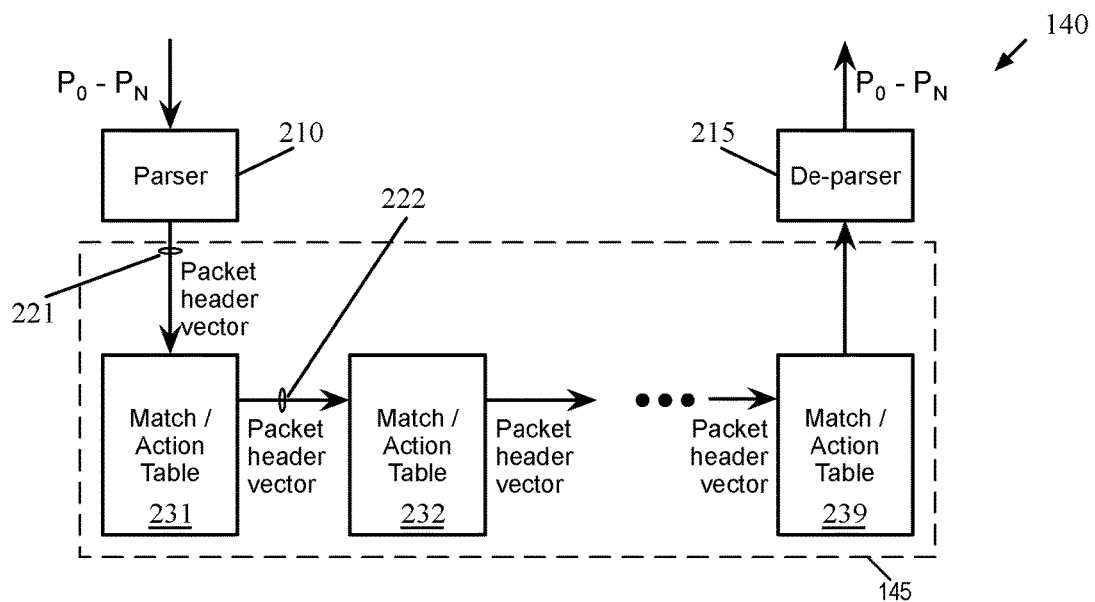
FIG. 2 conceptually illustrates a more detailed view of the flow table architecture of the forwarding element of some embodiments.

FIG. 2 conceptually illustrates a more detailed view of the flow table architecture 145 of the forwarding element 140 of some embodiments. Each of the ports $P_0$-$P_N$ connects to a parser 210, which parses the packet headers to create an initial packet header vector 221. In some embodiments, the parser 210 identifies the fields at specific locations in the packet and aligns the packet header data in a format that allows the logic units of the forwarding element hardware to identify the different header fields.

The forwarding element 140 then submits the packet header vector 221 to a successive sequence of match-action tables 231-239, which are implemented by the flow table architecture 145 of the forwarding element (e.g., by a set of ALUs and SRAMs, or other hardware constructs). In some embodiments, the packet header vector 221 is submitted to the first match-action table 231 to determine whether a matching entry can be found in the table. If so, the forwarding element 140 applies the corresponding actions to the packet, which may involve manipulating the data of the packet header vector (e.g., modifying MAC addresses, adding or removing VLAN tags or MPLS labels, decrementing the packet TTL, etc.), specifying to which of several possible second match-action tables the packet should be submitted, outputting the packet to a particular port, dropping the packet, etc. The forwarding element then submits a subsequent packet header vector 222 to the next match-action table 232, which operates in the same manner as the first table 231. This subsequent packet header vector 222 may be the same as the first packet header vector 221, or may include one or more modified values based on the actions specified by the identified action from the first table 231.

As shown, the packet headers are submitted to a sequence of match-action tables 231-239. Different embodiments implement the match-action stages differently. For example, some embodiments use a fixed sequence of tables, while other embodiments enable branching (i.e., the results of a first table determine to which of several possible tables the packet is next submitted). In addition, some embodiments postpone certain actions until all of the match-action stages are executed, whereas other embodiments perform each action as soon as the action is identified for a match stage. Once all of the match-action stages are complete, the resultant packet header vector is passed to a de-parser 215, which realigns the fields into a packet that can be output to one of the ports $P_0$-$P_N$ (assuming that the packet has not been dropped), which is specified by one of the match-action tables.

One of ordinary skill in the art will recognize that FIG. 2 does not illustrate all of the hardware aspects or functionalities of the forwarding element 140 of some embodiments. For example, such a forwarding element might include multiplexers, de-multiplexers, buffers/queues, etc., so as to receive and distribute packets properly.

Referring back to FIG. 1, in some embodiments the match-action tables 231-239 of the forwarding element 145 are configured according to instructions received from the controller 120 through the secure channel 130 (e.g., using the OpenFlow protocol). The controller can also modify the flow tables while the forwarding element is processing packets by sending configuration updates. Additionally, when a packet is received by the forwarding element that does not match any of the entries in a particular flow table, in some embodiments the forwarding element 140 sends the packet up to the controller 120 for analysis. The controller 120 then analyzes the packet and sends configuration information to the forwarding element 140 specifying modifications to the flow table so that the flow table will have an entry that the packet and subsequent packets like it will match.

Figure 3:
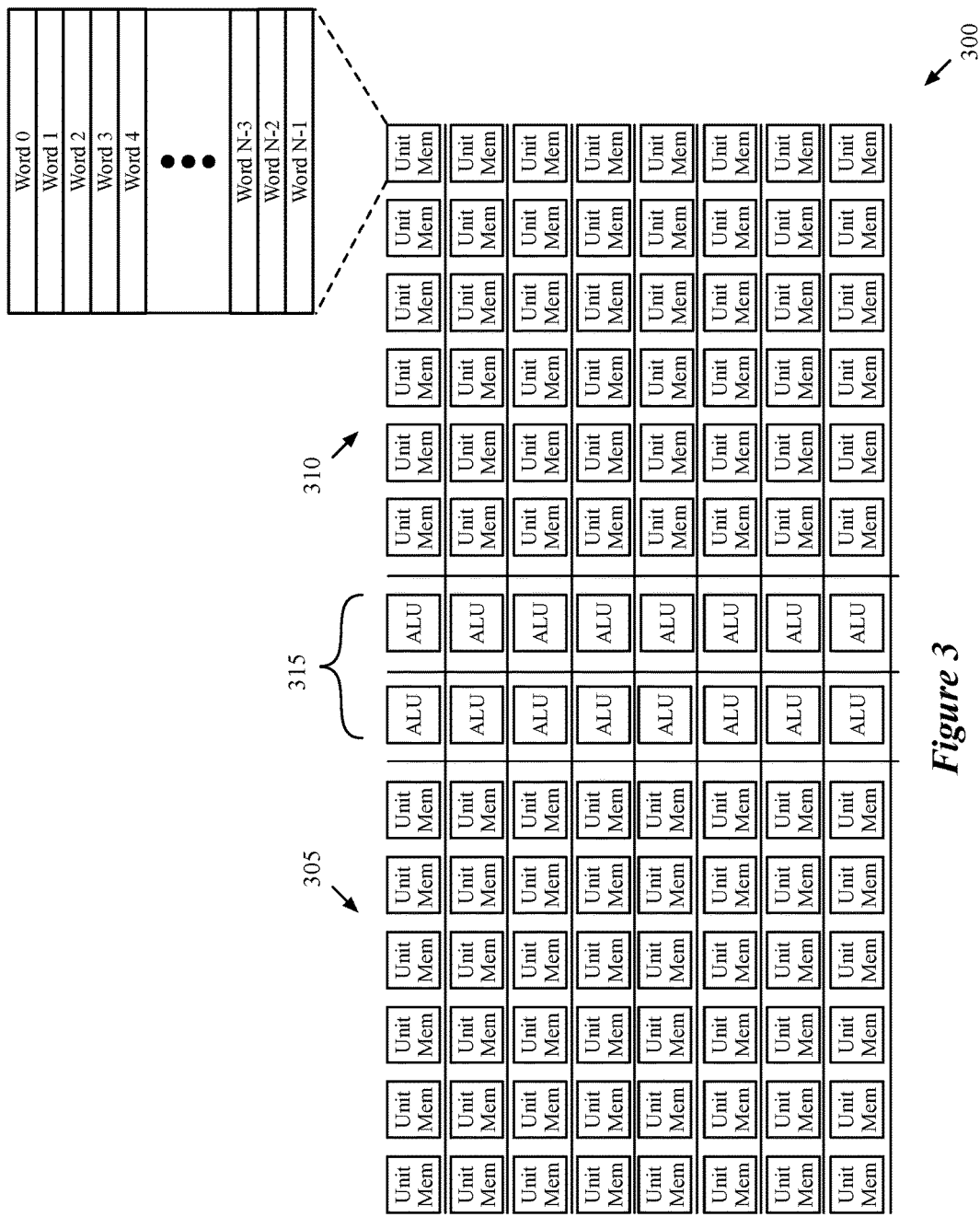
FIG. 3 conceptually illustrates a grid of unit memories.

As mentioned, the match-action tables of some embodiments are implemented using memory structures of the forwarding element. For example, some embodiments use pools of unit memories (e.g., SRAMs, TCAMs, etc.) to implement one or more match-action stages. In some embodiments, the unit memories are arranged in a grid of rows and columns. FIG. 3 conceptually illustrates such a grid 300 of unit memories. Specifically, this example shows 96 unit memories arranged in 16 logical rows, with each row associated with an arithmetic logic unit (ALU) 315. The 16 logical rows are divided into two separate grids 305 and 310 of eight rows, having six columns in each of the two separate grids. One of ordinary skill in the art will recognize that the arrangement of memories shown in FIG. 3 is only one of many examples of the possible arrangements of unit memories to implement match-action tables in a forwarding element, and that the inventive concepts described herein are applicable to many such arrangements.

These unit memories, in some embodiments, each have a number of memory locations, or "words" that can be read by the ALUs. The wiring that allows ALUs to read from several different rows is described in detail in the U.S. Provisional Application 62/108,409, filed Jan. 27, 2015, which is incorporated by reference herein. As shown for one of the unit memories 320, each memory includes N locations, from Word_0 to Word_N-1. In some embodiments, these locations each have a fixed width based on the specific unit memories used in the grid 300, such as 64 bits, 128 bits, 256 bits, etc. The ALUs 315 can read one memory location per unit memory in a given clock cycle. In some embodiments, separate sets of ALUs may be dedicated to performing packet modification operations or to performing packet state-related operations, such as statistics (counting), metering, etc. Some embodiments locate the state-related ALUs in the center of the grid of unit memories (as shown in FIG. 3), while locating the packet modification ALUs elsewhere in the hardware.

In some embodiments, each of the unit memories has a designated function. For instance, a first unit memory might store match entries, while a second unit memory stores the action entries that correspond to the match entries of the first unit memory. In addition, the unit memories may store other data for a match-action based forwarding element, including meters (used to measure data flow rates) and statistics (e.g., counters for counting packets, bytes, etc.).

II. Virtual Addressing of Action Memories

As noted above, each match entry of some embodiments include two portions: the set of match conditions for a packet to meet, and an address of the action entry to read when the set of match conditions are met by a packet. The address, in some embodiments, specifies both a memory page that indicates a unit memory within the grid of unit memories, and a location within that memory page.

During the usage of the forwarding element, the sets of match and/or action entries that occupy a unit memory may be moved from one unit memory to another. That is, in order to optimize the memory usage for a particular stage of the processing pipeline, a set of action entries residing on a first unit memory could be moved to a second, different unit memory. However, if the address stored by a match entry includes a reference to the first unit memory, then the data in this match entry (and all other match entries that reference action entries in the first unit memory would also need to be modified. Thus, the set of action entries stored on the first unit memory are assigned a virtual memory page number when the unit memories are initially configured. When the action entries are moved to the second unit memory, they retain this virtual memory page number. As such, the match entries that refer to these action entries need not be modified, as the address for each action entry stays the same.

Figure 4:
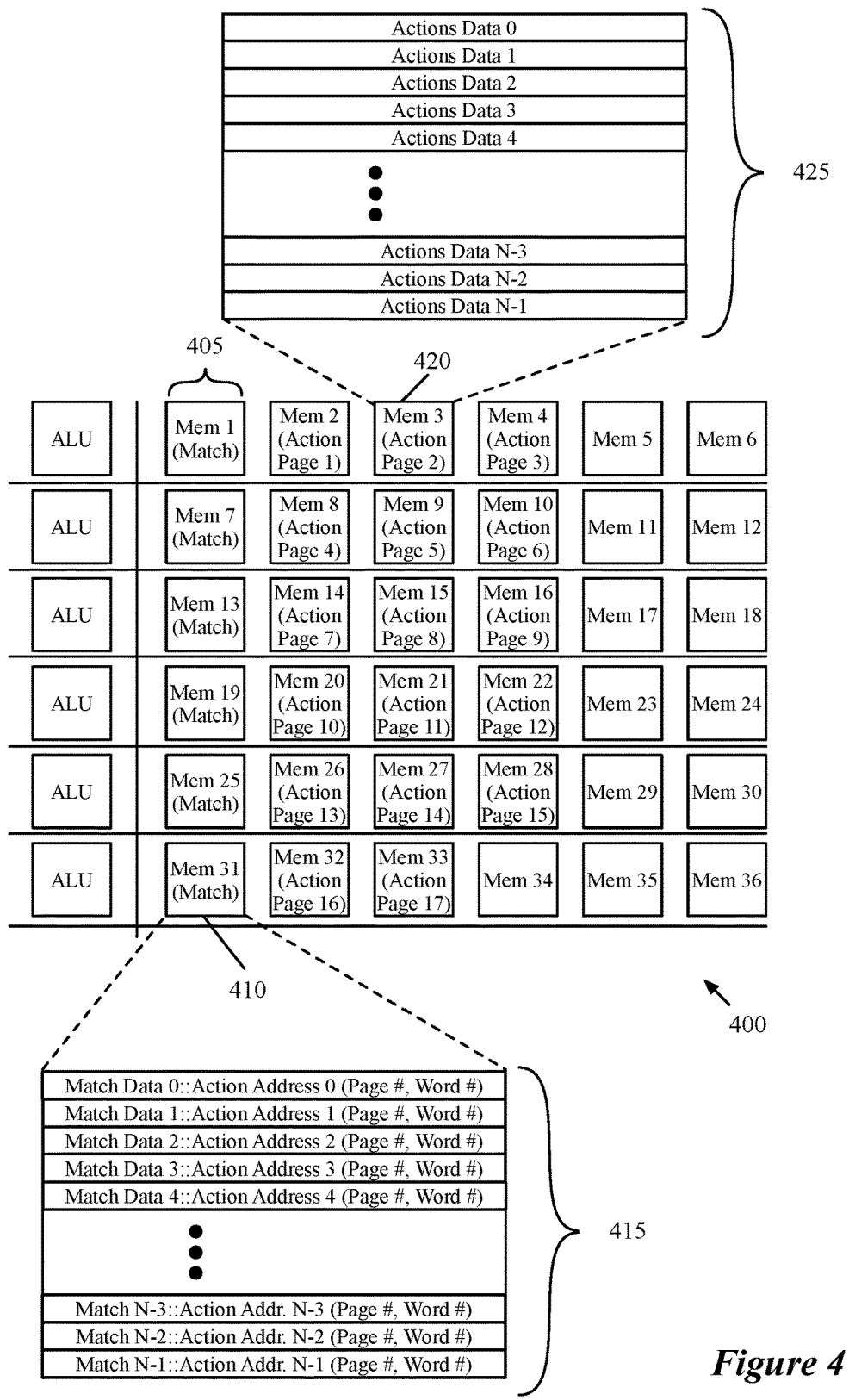
FIG. 4 illustrates a portion of a grid of unit memories that includes both match and action memories with virtual memory pages denoted for the action memories.

FIG. 4 illustrates a portion of a grid 400 of unit memories that includes both match and action memories with virtual memory pages denoted for the action memories. In this specification, the terms match memory and action memory are used to refer to generic unit memories that store match entries and action entries, respectively. In some embodiments, a set of the columns in a grid are allocated as match memories, and only may be used for sets of match entries. In some such embodiments, the remainder of the memories in the grid are allocated for all other types of memories, including action memories, meter memories, statistics memories, etc.

Specifically, in FIG. 4, the unit memories in the column 405 closest to the ALUs are allocated to store match entries. Some embodiments implement each match stage (e.g., a single match-action table) in one row of the grid of memories (allowing for certain amounts of overflows to the other rows, if needed). That is, the match memory (or memories) as well as any action memories, meter memories, statistics memories, etc. used for a particular match stage are located in the same row of unit memories. Some embodiments also use various wiring (e.g., a combination of vertical and horizontal wiring) to enable match stages to be spread across two or more rows. For example, the constraints applied in some embodiments are described in U.S. Provisional Application 62/108,409, filed Jan. 27, 2015, which is incorporated by reference above. However, for the purpose of this description, the match stages need not be so constrained.

In this example, each of the unit memories in the grid 400 has a memory number that corresponds to their locations in the grid, from 1 to 36. The unit memories in the first column 405 are denoted as match memories (i.e., they store match entries), as noted above. Many of the remaining unit memories are denoted as action memories, and some are not denoted in the figure (these could be unused, or store statistics or meters information). For the action memories, each memory is denoted with a page number that is separate from its location in the grid of unit memories 400. Specifically, each of the unit memories that stores action entries has a page number of 1-17. In some embodiments, the configuration of the various unit memories (e.g., data indicating which unit memories are allocated to which match stages, which types of entries are stored in each unit memory, and the page numbers currently assigned to each action memory).

FIG. 4 illustrates that the match memory 410 includes N locations (e.g., 1000 RAM words), each of which stores a match entry 415. Each of these match entries includes two portions: (i) a set of match conditions (or match data), and (ii) an address for a corresponding action entry. As described in later sections, in some embodiments the match entries use a direct addressing scheme in which the address of the match entry directly corresponds to the address of the corresponding action entry; however, for this figure and the subsequent section the indirect addressing shown here (in which the address is explicitly given in the match entry) is used. The set of match conditions includes one or more header field values or other packet data that can be used for matching (e.g., ingress port, MAC address, IP address, VLAN tag, etc.). In some embodiments, each match entry in a particular match memory (e.g., all of the match entries in the unit memory 410) has the same format for the match conditions. That is, each match entry matches over the same set of fields, only with different possible values for those fields (e.g., different MAC addresses).

The address portion of the match entries, in some embodiments, includes both a memory page number ("Page #") and a memory location ("Word #") within that memory page. In some embodiments, the grid includes up to 96 unit memories, so 7 bits are allocated for the memory page, although a coding scheme that uses one additional bit in order to allow for division of an action entry across multiple pages will be described below. In addition, in some embodiments, each unit memory includes 1000 locations (or 1024 locations), so 10 bits are allocated for the location within the specified unit memory. Some embodiments also specify a sub-word and use a different coding scheme to indicate the length and location of that sub-word within the full-length word from the memory page. Rather than the memory page value referencing a particular physical unit memory at a specific coordinate in the grid, the page number in the match data refers instead to the virtual page numbers assigned to the sets of action entries stored in a single action memory. This allows for the action entries stored in one unit memory to be moved to a different unit memory without the need to reconfigure the match data.

Just as the match memory 410 includes N locations 415 for storing match entries, the action memory 420 includes N locations 425 for storing N action entries. The action memory is unit memory 3 in the grid 400 of unit memories, but the set of action entries stored by this memory are assigned virtual page number 2. As such, the match memories in column 405 that refer to this entry specify a memory address using page number 2, rather than unit memory number 3. Each of these action entries includes actions data that indicates what actions to perform and any values needed for performing those actions. In some embodiments, the various actions stored in an action memory do not all have the same format. For instance, some of the actions might specify new values for certain packet header fields, while other actions simply indicate to drop the packet. In other embodiments, however, each action in a set of actions stored in a particular memory has the same format.

A. Use of Virtual Page Numbers When Moving Action Entries

Figure 5:
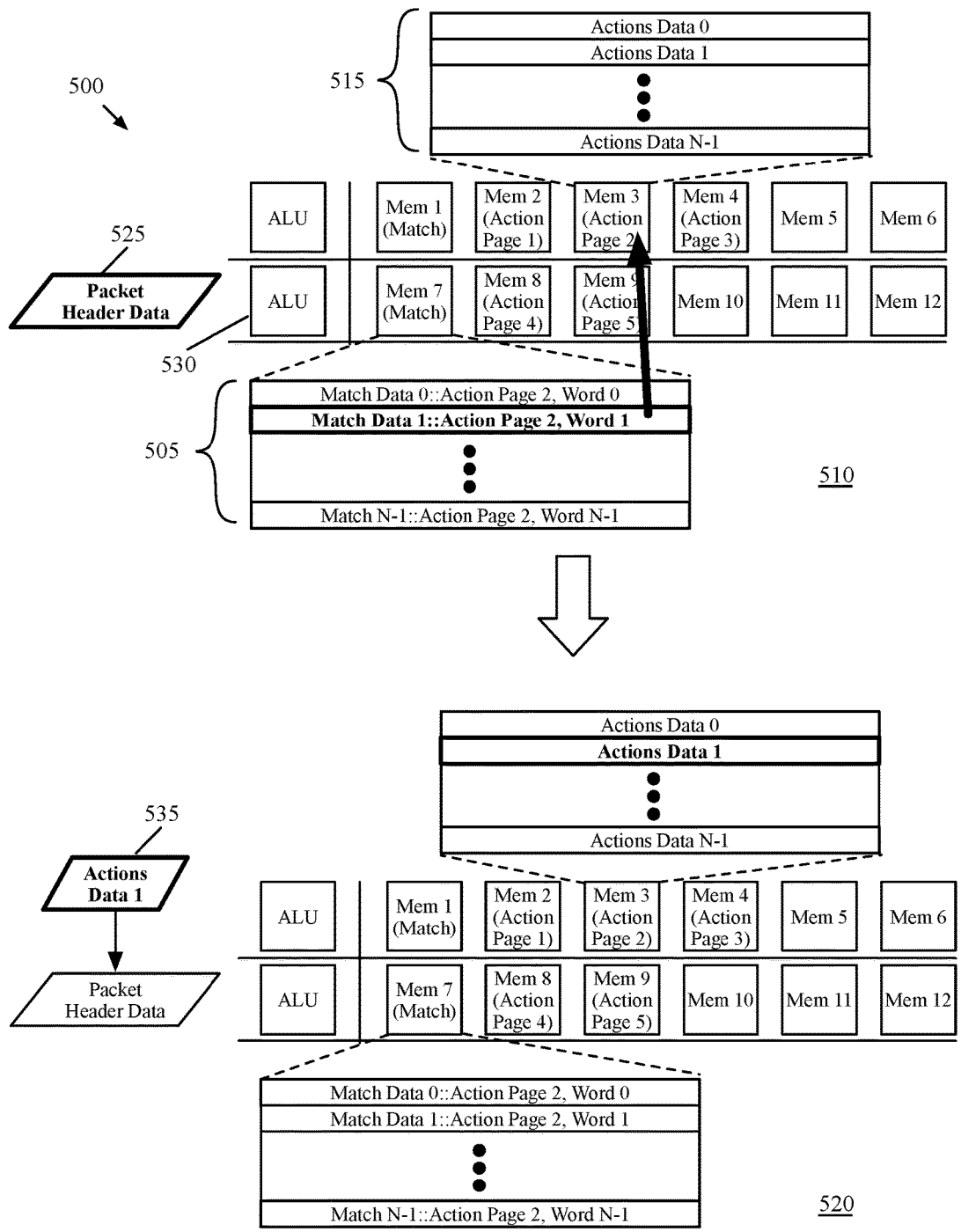
FIG. 5 illustrates a forwarding element matching packet header data to a match entry in a first unit memory that references action data in a second unit memory.
Figure 6:
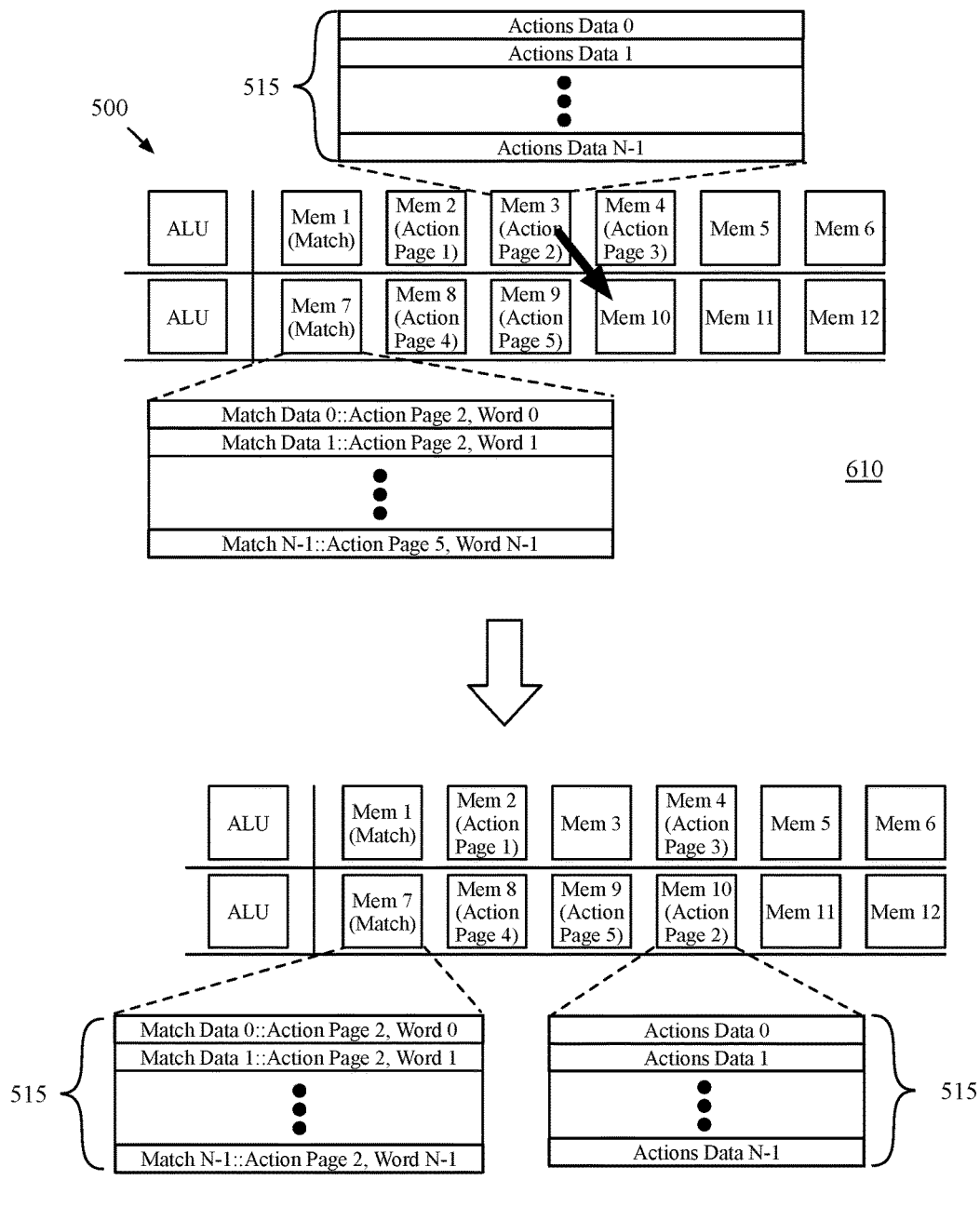
FIG. 6 illustrates the movement of the set of action entries of FIG. 5 from one unit memory to another in the grid.
Figure 7:
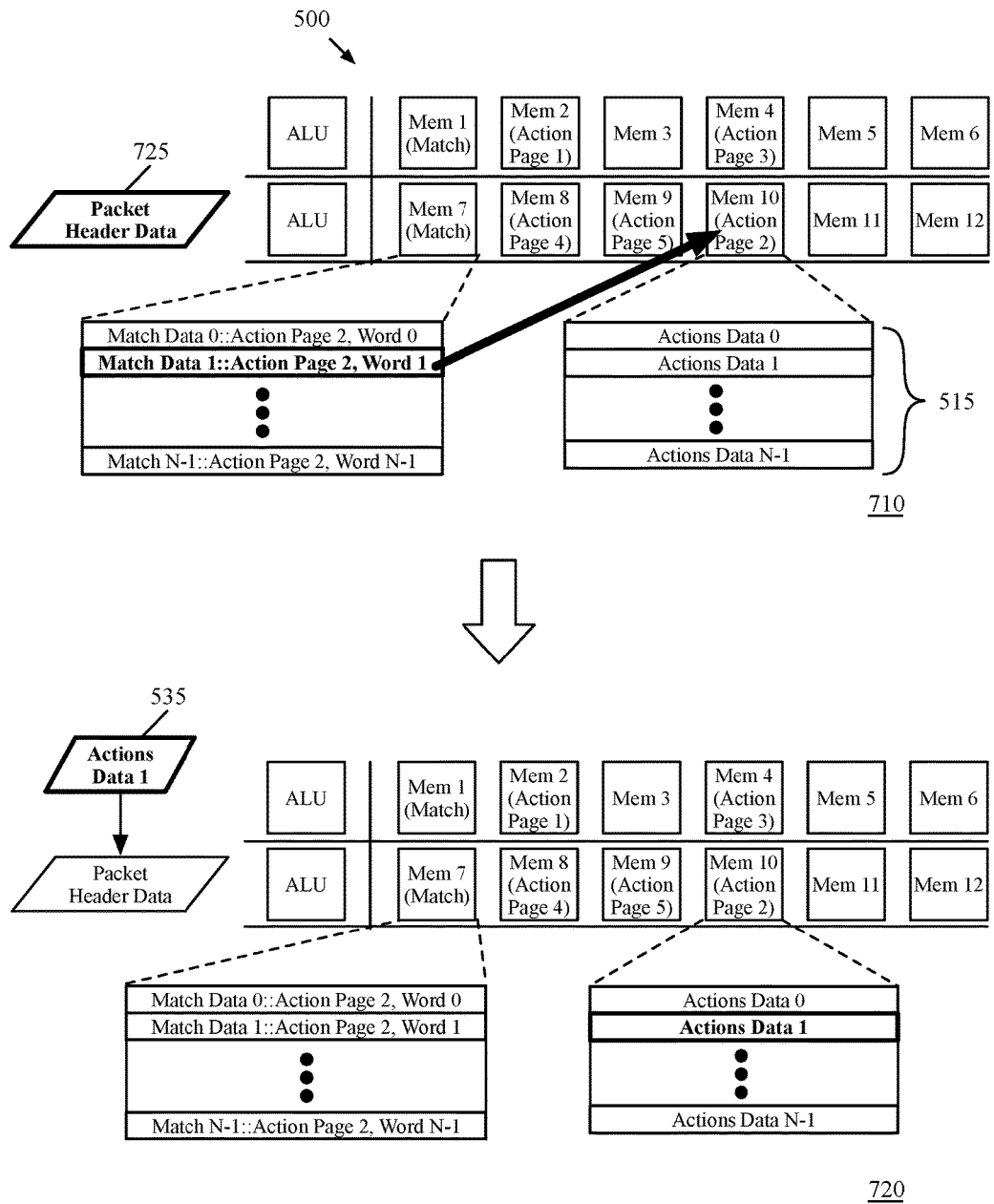
FIG. 7 illustrates the forwarding element of FIG. 5 matching packet header data for a new packet with the same header field values as the packet header data shown in FIG. 5 after the action entries have moved to the new unit memory.

As indicated previously, the assignment of virtual memory pages to sets of action entries allows for the action entries to be moved from one unit memory to another without consequences on the match entries that reference the moved action entries. FIGS. 5-7 illustrate the movement of such a set of action entries without affecting the match entries that correspond to the moved action entries.

Specifically, FIG. 5 illustrates a forwarding element matching packet header data to a match entry in a first unit memory that references action data in a second unit memory, over two stages 510 and 520. The first stage 510 illustrates a portion of a grid 500 of unit memories. For the sake of simplicity, only two rows of the grid 500 are shown in the figure. Two of these unit memories (those in the column closest to the ALUs) are allocated to storing sets of match entries, while five of the unit memories are allocated to storing action entries. The sets of action entries assigned to each of these five unit memories are assigned virtual memory page numbers, as shown in the figure. Specifically, the action entries in unit memory 2 are assigned as page 1, the action entries in unit memory 3 are assigned as page 2, the action entries in unit memory 4 are assigned as page 3, the action entries in unit memory 8 are assigned as page 4, and the action entries in unit memory 9 are assigned as page 5. As noted above, some embodiments assign these page numbers by storing configuration data that indicates the virtual page numbers currently associated with the different unit memories in the grid.

Also shown at this stage 510, the match entries 505 stored in unit memory 7 refer to action entries 515 stored in virtual page 2 (currently stored on unit memory 3). Each of the action entries includes its set of match conditions and a reference to a memory address, given by a memory page number and a location within that memory page. In the illustrated example, each of the match entries 505 refers to a corresponding location in the virtual page 2. However, when using the indirect addressing scheme illustrated here, some embodiments may have numerous match entries that refer to the same action entry (e.g., an entry that includes instructions to drop packets), or references that do not follow a neat order such as that shown.

In the first stage 510, packet header data 525 is submitted against the match table implemented by the match entries 505 stored in unit memory 7. In some embodiments, an ALU (e.g., the ALU 530 that shares the row with the match memory) performs the lookup to identify an entry with data that matches the current packet header data 525, and identify the action entry address from this match entry. In this example, the second match entry (match data 1) matches the packet header data 525, and this entry includes a reference to a memory address of location 1 in virtual page address 2. According to the current configuration of the memory grid 500, the virtual page address 2 corresponds to unit memory 3 in the grid.

In the second stage 520, one of the ALUs reads the action data from the memory location specified by the match entry matched at the previous stage 510. As shown, the forwarding element applies the actions data 535 to the packet header data 525. While in this case the action data specifies modifications to the packet header, in some cases the action entry could specify other types of actions to take, such as modifying the meters or statistics data, dropping the packet, outputting the packet, etc.

FIG. 6 illustrates the movement of the set of action entries 515 from one unit memory to another in the grid 500. Specifically, the set of action entries 515 are moved from the unit memory 3 to the unit memory 10 over two stages 610 and 620, while keeping their virtual page number. As shown in the first stage 610, the memory grid receives instructions (e.g., a sequence of configuration data from a memory controller) to move the action data stored in unit memory 3 to the unit memory 10. This move might be performed to accommodate the movement of different data (action data or other data) into the unit memory 3. For instance, the U.S. Provisional Application 62/108,409, incorporated by reference above, describes various reasons for the movement of data between unit memories.

In the second stage 620, the action entries 515 have now moved to the new unit memory 10. The details of such a movement in some embodiments are described below by reference to FIG. 9. As shown at this stage, (i) virtual page 2 is now associated with the unit memory 10 (e.g., by updating configuration data for the memory grid) and (ii) the match entries 505 are unchanged.

FIG. 7 illustrates, over two stages 710 and 720, the forwarding element matching packet header data 725 for a new packet with the same header field values as packet header data 525 after the action entries have moved to the new unit memory. In the first stage 710, the packet header data 725 is submitted against the match table implemented by the match entries 505, which remain in unit memory 7. In this example, the second match entry (match data 1) matches the packet header data 725, as the packet data is the same as in FIG. 5. The unmodified match entry still includes a reference to a memory address of location 1 in virtual page address 2. The configuration data for the memory grid 500 now identifies that the virtual page address 2 currently corresponds to unit memory 10 in the grid, rather than unit memory 3. As such, in the second stage 720, one of the ALUs reads the action data from the memory location specified by the match entry matched at the previous stage 710. As shown, the forwarding element applies the action data 535 to the packet header data 725.

One of ordinary skill will note that the same concepts described in this section may apply to any other sets of referenced data that are moved between unit memories as a block. For instance, if the metering data in a meters memory is assigned a virtual page number and moved to another unit memory, then any actions or other data that reference the metering data need not be modified so long as the virtual page number moves with the data.

B. Process for Implementing Match-Action Stage

Figure 8:
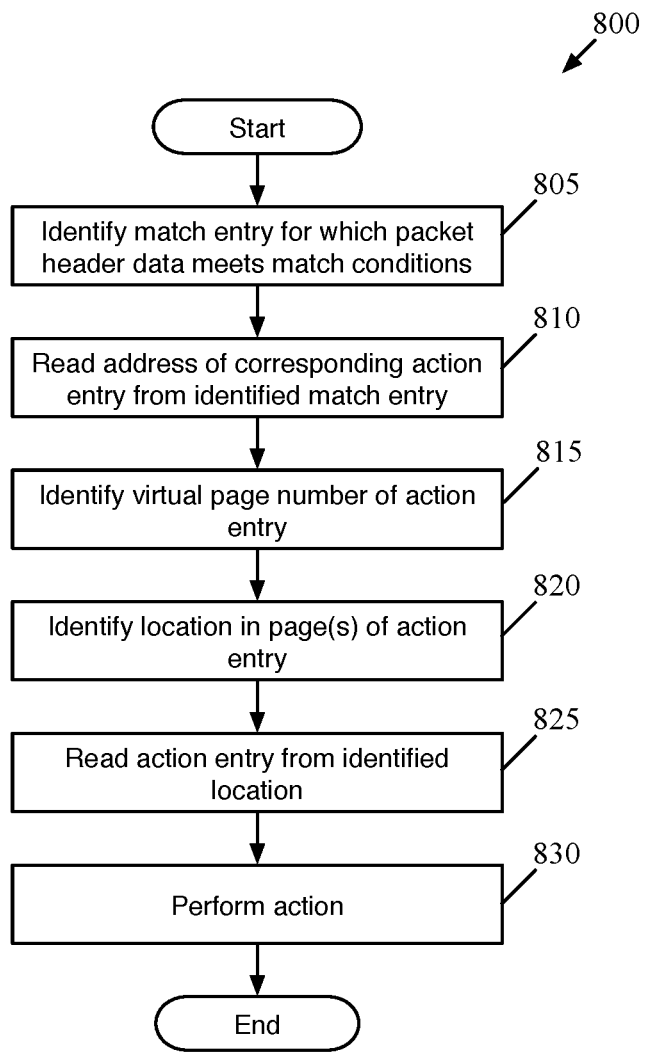
FIG. 8 conceptually illustrates a process of some embodiments for implementing a flow table at a forwarding element.

FIG. 8 conceptually illustrates a process 800 of some embodiments for implementing a flow table at a forwarding element. Specifically, the process 800 shows the operations performed by the forwarding element of some embodiments to match a packet against the match memory (or memories) that store the match conditions for a flow table and to read action data from an action memory (or memories) that indicate the actions to perform for a match entry matched by the packet. This process uses the indirect addressing scheme described in this section, in which the address of the action entry is specified by a series of bits in the corresponding match entry.

As shown, the process 800 begins by identifying (at 805) a match entry within a particular flow table for which a set of packet header data meets the match conditions. In some embodiments, as described above, packet header data (sets of packet header field values, as well as additional values not technically part of a packet as sent on the wire, such as the ingress port on which the packet was received) is submitted to a series of match-action tables (also called flow tables). The flow entries of a flow table are stored in multiple unit memories, with the match conditions for the different table entries stored in one unit memory and the actions to perform stored in a different unit memory (or multiple memories). In some embodiments, circuitry in the forwarding element identifies a match entry having the match conditions that is met by the packet data by performing content addressable lookup or by scanning through the match entries in the appropriate match memory.

The process 800 then reads (at 810) the address of the corresponding action entry from the identified match entry. As noted, the match entries of some embodiments (when using an indirect addressing scheme) include both a set of match conditions and an address for the action entry. In some embodiments, the address of the action entry includes a first portion (e.g., 7 bits) that denotes the memory page (i.e., the unit memory) and a second portion (e.g., 10 bits) that denotes the specific location in the memory page (i.e., the word).

Thus, the process identifies (at 815) a virtual memory page number for the action entry, and identifies (at 820) a location in the virtual memory page at which the action entry is located. The virtual memory page number corresponds to a set of action entries stored in a unit memory, although that particular unit memory may change when the set of action entries are moved from one memory to another. The above examples illustrate the case in which each action entry is stored on a single unit memory. However, in some embodiments, action entries may be divided across multiple memories. As described in subsection D.1 below, some embodiments use a coding scheme in which a single additional bit is added to the memory page address, allowing for the address to specify multiple unit memories with multiple virtual page numbers. Furthermore, as described in subsection D.2 below, some embodiments use a different coding scheme in which a fixed set of bits are used to specify a length and location of a sub-word for an action entry within an action word, which may be divided across multiple unit memories that share a virtual page number. Because only one location can be read from each unit memory during a clock cycle, some embodiments store action entries that require more data than provided by a single memory location across multiple memories. This allows the ALU to read from multiple memories at once during a single clock cycle.

The process 800 next reads (at 825) the action entry from the identified location of one or more unit memories. In some embodiments, the ALU performing the read broadcasts the virtual page number to the unit memories in the appropriate grid, and the memory (or memories) configured with the broadcasted virtual page number provides the data from the requested memory location. When multiple page numbers are needed, the ALU broadcasts multiple virtual page numbers and reads the data from each of the corresponding memories. Finally, the process performs (at 830) the action or actions specified by the one or more action entries, then ends. These actions may include modifying packet header values (e.g., changing IP addresses for NAT operations, changing MAC addresses for routing operations, adding or removing VLAN tags, applying a tunnel encapsulation, etc.), dropping a packet, outputting a packet to a specified port, modifying statistics or meters, etc.

C. Movement of Data Between Unit Memories

As shown in FIG. 6, some embodiments move data (e.g., a set of action entries, a set of match entries) from one unit memory to another during the course of packet processing. In order to avoid interruption in the processing of packets during such move operations (important, as a switch may process thousands, or even millions, of packets per second), some embodiments use a set of control bits for each unit memory, as well as a global control bit.

Specifically, some embodiments use a global control bit to identify which of two overall configurations is active, and then use two control bits for each unit memory to identify whether the unit memory participates in each of the two configurations. When the configuration is static (i.e., none of the data is being moved from one unit memory to another), each of the unit memories either participates in both of the two configurations or does not participate in either configuration. During the course of the data move, however, the unit memory from which the data is being moved (the source memory) participates in only one of the configurations (the "old" configuration), while the unit memory to which the data is being moved (the destination memory) participates in the other of the two configurations (the "new" configuration). Upon completion of the move, the global control bit is flipped from the old configuration to the new configuration, thereby switching the source memory to inactive and the destination memory to active.

Figure 9:
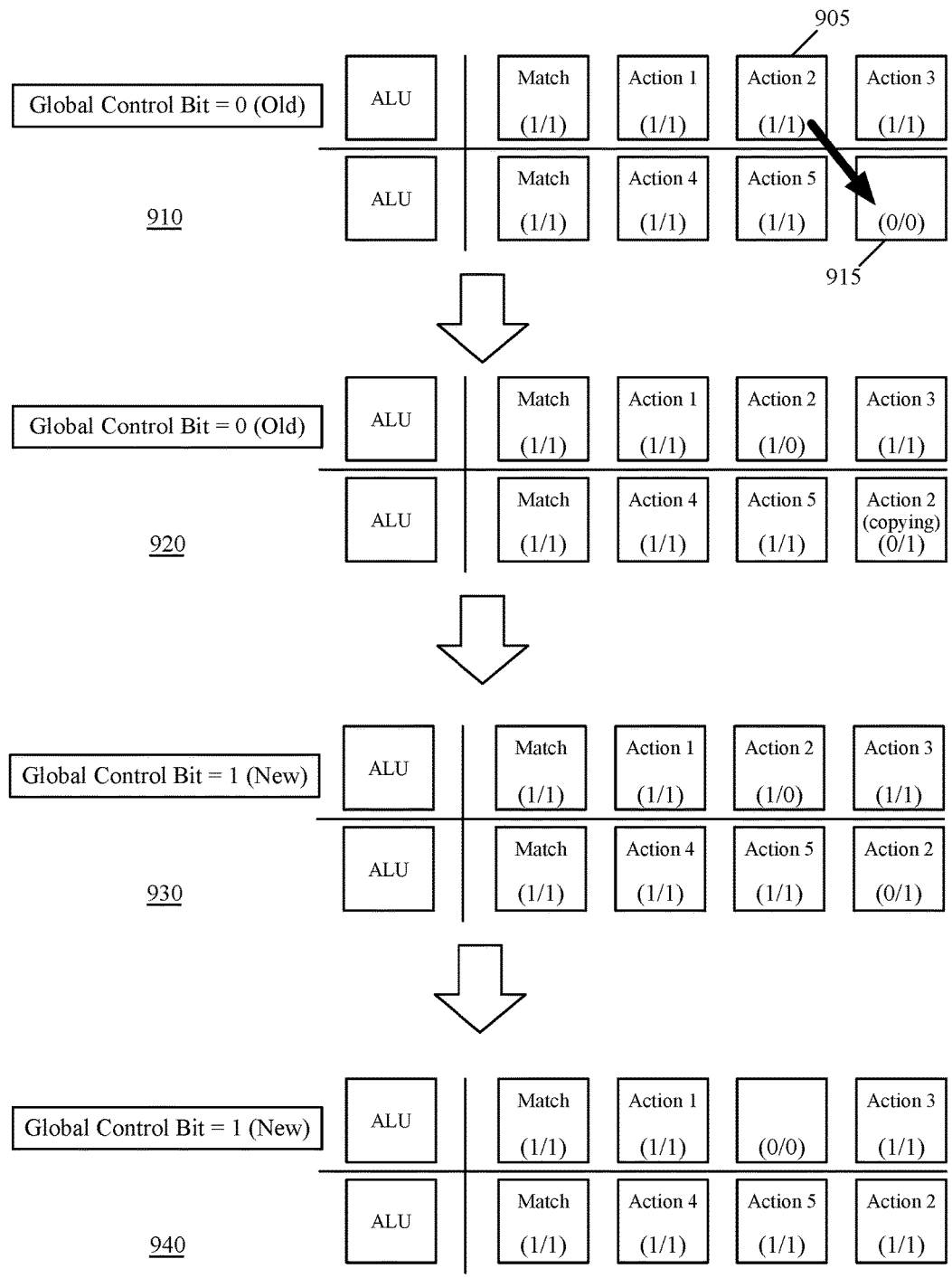
FIG. 9 conceptually illustrates the movement of action data from a source unit memory to a destination unit memory.

FIG. 9 conceptually illustrates the movement of action data from a source unit memory 905 to a destination unit memory 915 over four stages 910-940. The first stage 910 illustrates a grid 900 of unit memories, including both match memories (units currently allocated to match data) and action memories, which are assigned virtual page numbers 1-5. The figure shows a global control bit (set to either 0 or 1) and two configuration bits for each memory. For each memory, the first configuration bit indicates whether the memory is active for the "old" configuration (when the global control bit is set to 0) and the second configuration bit indicates whether the memory is active for the "new" configuration (when the global control bit is set to 1).

At the first stage 910, each of the two match memories and the five action memories with current data has configuration bits of 1/1, indicating that these memories participate in both the old and new configurations. The blank (unconfigured) unit memory 915 is set to 0/0, indicating that it participates in neither the old nor the new configuration. In addition, the global control bit is currently set to 0, setting the old configuration active. At this point, the memory grid (e.g., a control circuitry that is responsible for configuring the data in the memory grid) receives instructions to move the action entries currently stored in the source unit memory 905 to the destination unit memory 915.

As such, the control circuitry manipulates the configuration bits of these two unit memories at the second stage 920 and begins the copying procedure. Specifically, the second configuration bit of the source unit memory 905 is flipped to 0, while the second configuration bit of the destination unit memory 915 is flipped to 1. As the global control bit remains 0 during the copying process, the source unit memory remains active during this stage (as it has the complete set of action entries for virtual memory page 2) while the destination unit memory remains inactive (as it does not yet have the complete set of data for virtual memory page 2).

Once the copying process is complete, at the third stage 930, the control circuitry flips the control bit to 1. This means that the source unit memory 905 is inactive (although it still has the complete set of action entries for virtual memory page 2) and the destination unit memory 915 is active (this unit memory now also has the complete set of data for the virtual memory page). Thus, at the fourth stage 940, the control circuitry removes the data from the unit memory 905, and sets its configuration data to 0/0, so that it does not participate in either configuration. Similarly, the destination unit memory now has configuration data of 1/1, like the other active memories. While the global control bit is 1 at this stage, in the steady state the control bit can have either value without affecting the operation of the memories.

As noted below, the match entries may move between unit memories as well in some embodiments. In this case, similar operations for moving the match entries apply to these unit memories as well.

D. Action Entries Divided Across Multiple Unit Memories

In the examples shown in subsection A above, each action entry fits within a single memory location, and thus is assigned to a single unit memory. However, in some cases, action entries may require more bits than the width of a memory location, and therefore are divided across multiple unit memories. For example, if the memories have 128-bit widths, then a 192-bit or 256-bit action entry requires two unit memories. As explained above, because the entire entry should be read in a single clock cycle, it is preferable for the entries to be divided across multiple unit memories rather than multiple locations within a single unit memory.

As mentioned above, two different addressing schemes may be used in different embodiments to handle the situation in which action entries are spread across multiple unit memories. The first action entry address coding scheme assigns different virtual page numbers to each unit memory, and specifies an action entry by referring to multiple subsequent virtual page numbers. The second action entry address coding scheme, on the other hand, assigns the same virtual page number to multiple unit memories in some cases, with each action entry address referring to only a single virtual page number.

1. Entries Assigned to Multiple Virtual Page Numbers

Figure 10:
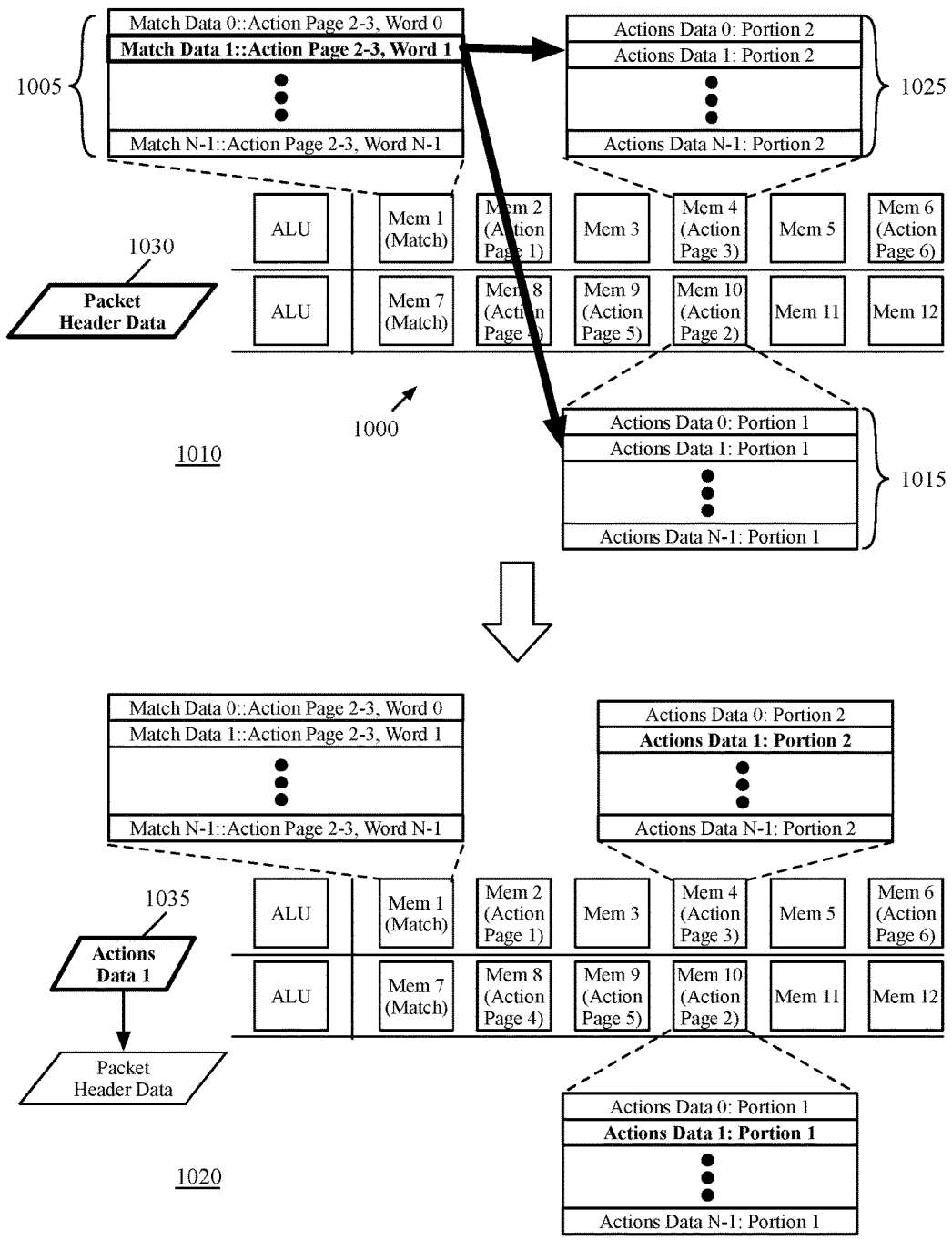
FIG. 10 illustrates an example of a forwarding element matching packet header data to a match entry in a first unit memory that references action data divided across two unit memories.

FIG. 10 illustrates an example of a forwarding element matching packet header data to a match entry in a first unit memory that references action data divided across two unit memories, over two stages 1010 and 1020. The first stage 1010 illustrates a portion of a grid 1000 of unit memories, showing two rows of the grid. Two of the unit memories (those in the column closest to the ALUs) are allocated to storing sets of match entries, while six of the unit memories are allocated to storing action entries. The sets of action entries are assigned virtual memory page numbers from 1-6, as shown in the figure.

Also shown at this stage 1010, the match entries 1005 stored in unit memory 1 (a match memory) refer to two pages of action entries. As in the previous examples, the match entries 1005 include both a set of match conditions (the match data) and an address that includes both memory page numbers (referring to virtual pages rather than directly to physical unit memories) and memory locations (words). However, in this case, the addresses refer to locations in memory pages 2-3. As shown, the action data in unit memory 10 (virtual page 2) is a first portion 1015 of each of the action entries, while the action data in unit memory 4 (virtual page 3) is a second portion 1025 of each of the action entries.

In this first stage 1010, packet header data 1030 is submitted against the match table implemented by the match entries 1005 stored in unit memory 1. In this example, the second match entry (match data 1) matches the packet header data 1030, and this entry includes a reference to a memory address of location 1 in virtual memory pages 2-3. The configuration data for the memory grid 1000 identifies that the virtual page address 2 corresponds to memory 10 in the grid and the virtual page address 3 corresponds to memory 4 in the grid.

In the second stage 1020, one of the ALUs reads the action data from the memory locations in the two memory pages specified by the match entry matched at the previous stage. As shown, the forwarding element applies the action data 1035 to the packet header data 1030. In some embodiments, the forwarding element combines the data from the two portions of the action entry to apply the data to the packet header.

In the above example, the action entry data was spread over two memory pages. Assuming that each memory page requires 7 bits to denote, this would mean 14 bits are required to denote two memory pages. Denoting four memory pages for a larger action entry requires 28 bits of the match entry. For a 128-bit memory width, this quickly becomes a significant amount of the available memory. If a tunnel encapsulation action entry requires approximately 1000 bits, this would use eight memory pages, or 56 bits of memory address (in addition to some number of bits required to specify the number of memory pages).

As such, some embodiments denote the page addresses with a coding scheme that uses only one extra bit beyond the number of bits used for a single page address (e.g., 8 bits rather than 7). The coding scheme of some embodiments specifies a number of least significant bits in the virtual page number that can be either 0 or 1 when reading the page number. Specifically, the coding scheme uses a number of 1s (or 0s) at the end of the page number to indicate the number of pages across which the action entry is divided. Thus, if the last bit (e.g., for a 7-bit address, the $8^{th}$ bit) is a 0, then the other bits will specify a single virtual page number for the action entry. If the last bit is a 1, then the next-to-last bit can be either 0 or 1, and the action entry is divided across at least two memory pages. Reading from the last bit, each bit that is a 1 (before reaching the first 0), as well as the first bit that is a 0, can be either a 0 or 1 in determining the virtual page numbers. Thus, three 1 bits followed by a 0 indicates that the referenced action entry is split across eight memory pages with virtual page addresses ranging from XXX . . . 000 to XXX . . . 111. If the number of is in a row starting from the last bit is N, then the action entry is divided across $2^N$ pages. For instance, in the preceding example, pages 2-3 would be denoted as 00000101. The first bit (reading from the end) being a 1 specifies that the next bit is interchangeable, and the second bit being a 0 indicates that no additional bits are interchangeable. Thus, 00000101 is translated into 0000010 (2, in decimal notation) and 0000011 (3, in decimal notation).

This limits the action entries to being divided across a number of unit memories that is a power of two (with the additional limitation that the first page number is a multiple of that factor of two), at considerable data savings. In addition, the virtual page numbers ensure that the four, eight, etc. unit memories used for an action entry need not be subsequent to each other in the grid, so long as the virtual page numbers are subsequent to each other.

Figure 11:
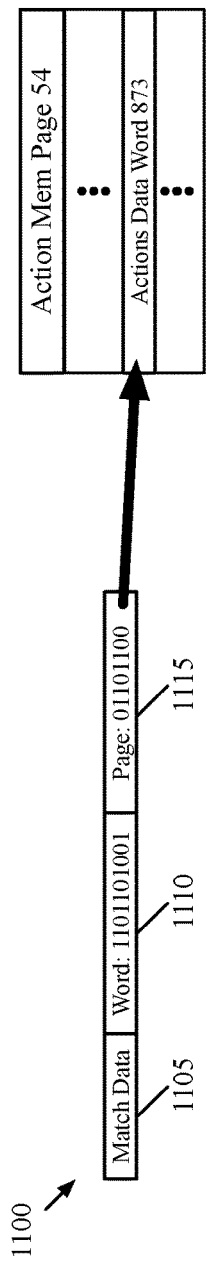
FIGS. 11-13 illustrate three examples of match entries that reference action entries divided across different numbers of virtual memory pages, using the coding scheme of some embodiments.
Figure 12:
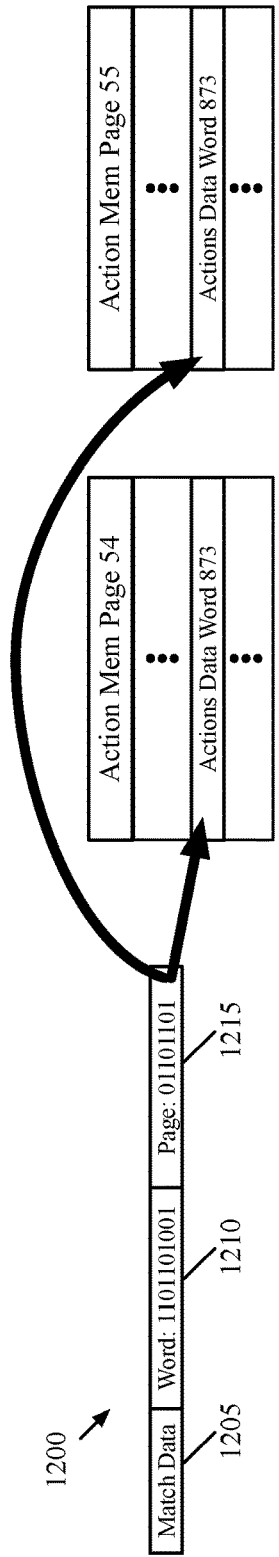
Figure 13:
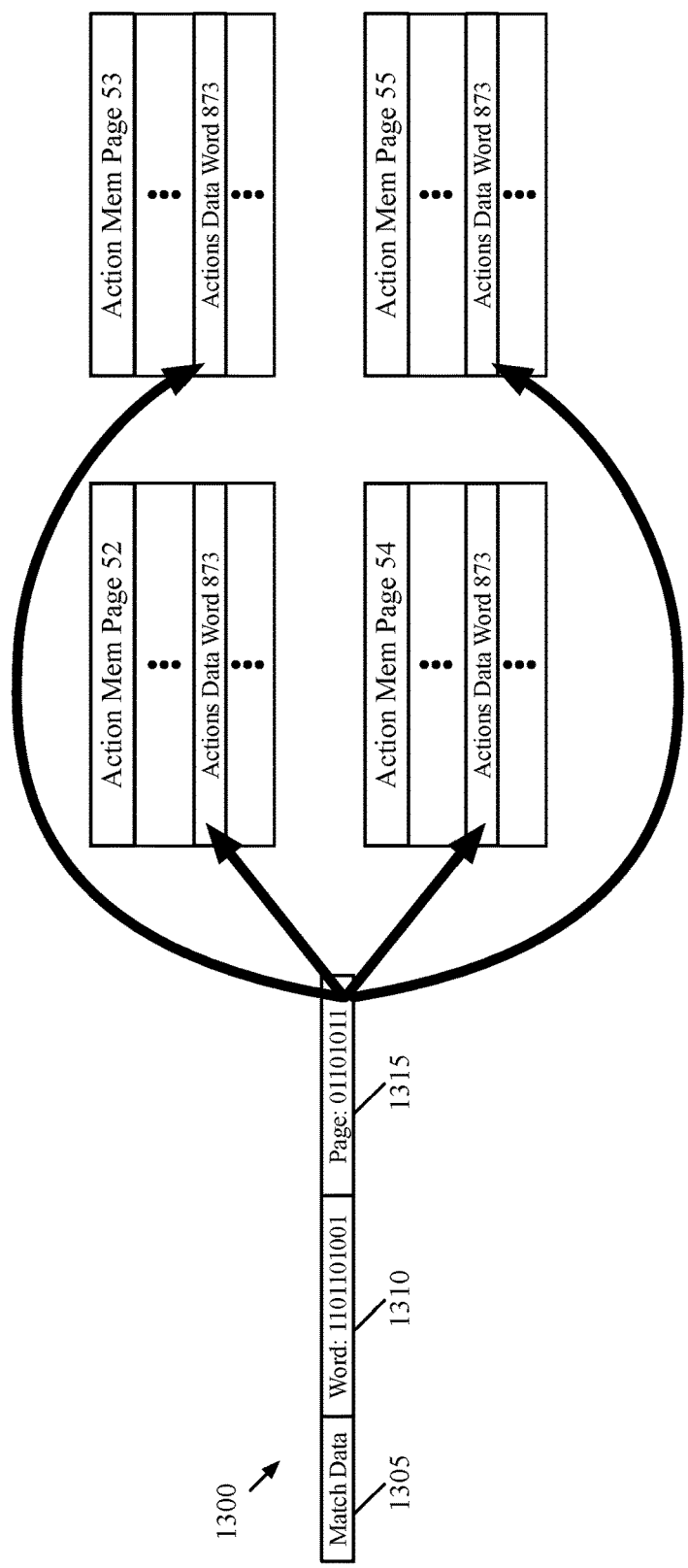

FIGS. 11-13 illustrate three examples of match entries that reference action entries divided across different numbers of virtual memory pages, using the coding scheme of some embodiments. These three entries use different numbers of trailing 1s in the memory page address bits in order to reference different numbers of memory pages for an action entry. As shown in FIG. 11, the match entry 1100 includes match data 1105, a location (word) address 1110, and a page address 1115. The match data 1105 can be any set of match conditions for a flow entry (e.g., source or destination IP address, source or destination MAC address, VLAN tag, switch ingress port, etc.) that specifies when a packet has matched the flow entry. The location address 1110 indicates the location in one or more specified memory pages at which the corresponding action entry is located. When the unit memories include 1000 locations, the location address uses 10 bits to designate the location. In this case, the location address 1110 has a value of 1101101001, which translates to location 873 in decimal notation.

Lastly, the virtual page address 1115 uses 8 bits in this and the subsequent examples. However, in a grid of 96 memories, only 7 bits are required to specify a memory page. The eighth bit is used in order to implement the coding scheme described above, to determine how many virtual pages the address points to. In this case, with a page address of 01101100, the eighth bit being a 0 indicates that the corresponding action entry is contained within a location of a single memory page, given by the first seven bits of the page address (0110110). This translates to virtual page number 54 in decimal, and therefore the match entry refers to an action entry at location 873 of virtual memory page 54, as shown in the figure.

FIG. 12 illustrates a match entry 1200 that also includes match data 1205, a location address 1210, and a page address 1215. The match data 1205 and location address 1210 are as described above, with the same bit pattern giving the same location address 1210 of 873. However, the page address 1215 has a single trailing 1, indicating that the referenced action is divided across two virtual memory pages (and therefore two unit memories). Specifically, it means that the seventh bit in the address can be either 0 or 1, meaning that the action entry is located in word 873 of pages 0110110 (54) and 0110111 (55), as shown in the figure.

FIG. 13 then illustrates a match entry 1300 that also includes match data 1305, a location address 1310, and a page address 1315. The match data 1305 and location address 1310 are as described above, with the same bit pattern again giving the same location address 1310 of 873. However, in this case, the page address 1315 has two trailing 1s, indicating that the referenced action is divided across four ($2^2$) virtual memory pages, and therefore four unit memories. Specifically, it means that the sixth and seventh bits in the address can be either 0 or 1, meaning that the action entry is divided across word 873 of pages 0110100 (52), 0110101 (53), 0110110 (54), and 0110111 (55), as shown in the figure.

2. Virtual Page Numbers that Map to Multiple Unit Memories

Whereas the above coding scheme for action entry addresses allows a match entry to reference multiple virtual page numbers for a single action entry, other embodiments use a coding scheme for the action entry addresses in which a single virtual page number may be assigned to multiple unit memories, but each action entry address only references a single virtual page number.

Figure 14:
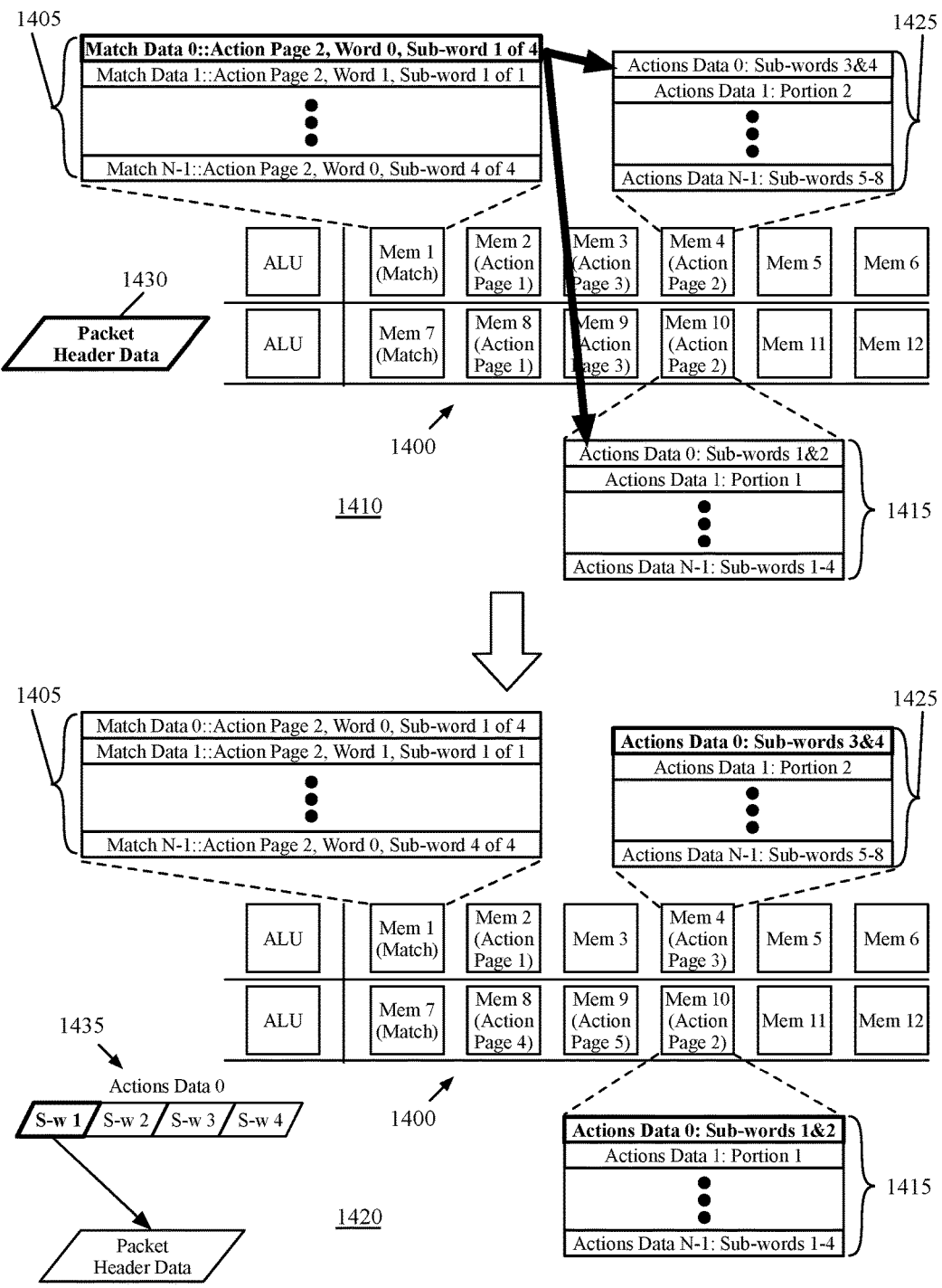
FIG. 14 illustrates an example of a forwarding element matching packet header to a match entry in a first unit memory that references action data divided across two unit memories that share a virtual page number.

FIG. 14 illustrates an example of a forwarding element matching packet header to a match entry in a first unit memory that references action data divided across two unit memories that share a virtual page number, over stages 1410 and 1420. The first stage 1410 illustrates a portion of a grid 1400 of unit memories, showing two rows of the grid. Two of the unit memories (those in the column closest to the ALUs) are allocated to storing sets of match entries, while six of the unit memories are allocated to storing action entries. However, the entries of the action table may be up to twice the unit memory width (e.g., up to 256 bits if the unit memory is 128-bits wide. Therefore, the six unit memories store three sets of action entries, and each of three virtual page numbers is assigned to two separate unit memories. For example, the second column of unit memories (unit memory 2 and unit memory 8) are both assigned virtual page number 1.

Also shown at the first stage 1410, the match entries stored in unit memory 1 refer to the action entries stored in the action memories by reference to a page number, a word within that page, and a sub-word within that word. In this example, different match entries may refer to different action memory pages. In addition, within a page, different memory locations (words) may have different numbers of sub-words (and thus different size sub-words). For instance, the first match entry (match data 0) in the set of entries 1405 references sub-word 1 of 4 within word 0, whereas the second match entry references the entire word in word 1. The last match entry in the set of match entries 1405 also references word 0, but references sub-word 4 of 4.

As shown by the action entries 1415 and 1425, the first portion of the action words for virtual action memory page 2 are stored in unit memory 10, while the second portion of these action words are stored in unit memory 4. These action words may be divided into action entries differently; though shown within the action data, the division is actually defined by the match data entries in some embodiments. That is, each word within an action unit memory does not specify how it is divided, but instead simply contains its configured bits (e.g., 128 bits). Instead, the action entry address specifies which bits from within an action word to use for a particular match data entry. In the example, the first action word is split into four sub-words, with the first two sub-words in the unit memory 10 and the second two sub-words in the unit memory 4. On the other hand, the second action word contains a single action entry divided across the two unit memories, while the last action word contains four sub-words in each of the two unit memories.

In this first stage 1410, incoming packet header data 1430 is submitted against the match table implemented by the match entries 1405 stored in unit memory 1. In this example, the first match entry (match data 0) matches the packet header data 1430. This entry includes a reference to a memory address of word 0 in virtual memory page 2. The configuration data for the memory grid 1400 identifies that this virtual page address corresponds to memories 10 and 4 in the grid.

In the second stage 1420, one of the ALUs reads the action data from the memory locations in the two unit memories specified by the match entry matched at the previous stage. As shown, this action data 1435 includes four sub-words retrieved from the two unit memories 10 and 4. Based on the action entry address specifying that the action entry is in sub-word 1 of 4 (thereby defining the length of the sub-words), the forwarding element applies the action data from this first sub-word to the packet header data 1430.

In the above example, the action entry words are spread over two unit memories, because at least some of the action entries require more data than the width of a single unit memory. However, some of the action entries use less than the full word width (e.g., 256 bits, for 128-bit wide unit memories), and therefore multiple entries may be compressed into a single word in order to save space. For instance, in the 256-bit example, a single word (across two unit memories) might have two 128-bit entries, four 64-bit entries, eight 32-bit entries, etc.

For the ALU to identify which portion of a word to use for action data, however, the action entry address must specify both the number of sub-words (or the width of each sub-word) within an action word as well as the specific one of the sub-words to use. To specify this data in an efficient manner, some embodiments use a scheme that uses a fixed number of bits for the sub-word data, with the allocation of these bits between (i) the data specifying the width of sub-words in an action word and (ii) the data specifying the particular sub-word to use varying depending on the length of the sub-word. Specifically, some embodiments use more bits to specify when a sub-word is longer, and thus because there are fewer sub-words, fewer bits to specify the particular sub-word to use.

For a fixed number of bits X, at least the last (least significant) bit is used to specify the sub-word length (for a minimum length sub-word), and at a maximum all of the bits are used to specify the sub-word length (when the action entry uses the entire word). In the latter case no bits are necessary to specify the particular sub-word, as there is only one option. In some embodiments, this variable bit allocation scheme is designed such that the number of trailing is in the sub-word portion of the address indicates the length of the action entry. When all of the bits are 1 (possibly except the first), the action entry uses the entire width of the word. On the other hand, when the last bit is 0, then the action entry has a minimum width, and all of the remaining bits are used to specify the sub-word. The fixed number of bits X are chosen such that $(X-1)^2$ equals the number of sub-words of minimum length. For example, if the minimum length of an action entry is 8 bits, and four unit memories are used for a page for a total word width of 512 bits, then a maximum of 64 sub-words could be used. In this case, 6 bits (for number 0-63) are necessary for specifying the sub-word location, and therefore X=7. Additional trailing is increase the width of the sub-words and therefore reduce the number of possible sub-words within an action word, thereby reducing the number of bits needed to specify the sub-word.

Figure 15:
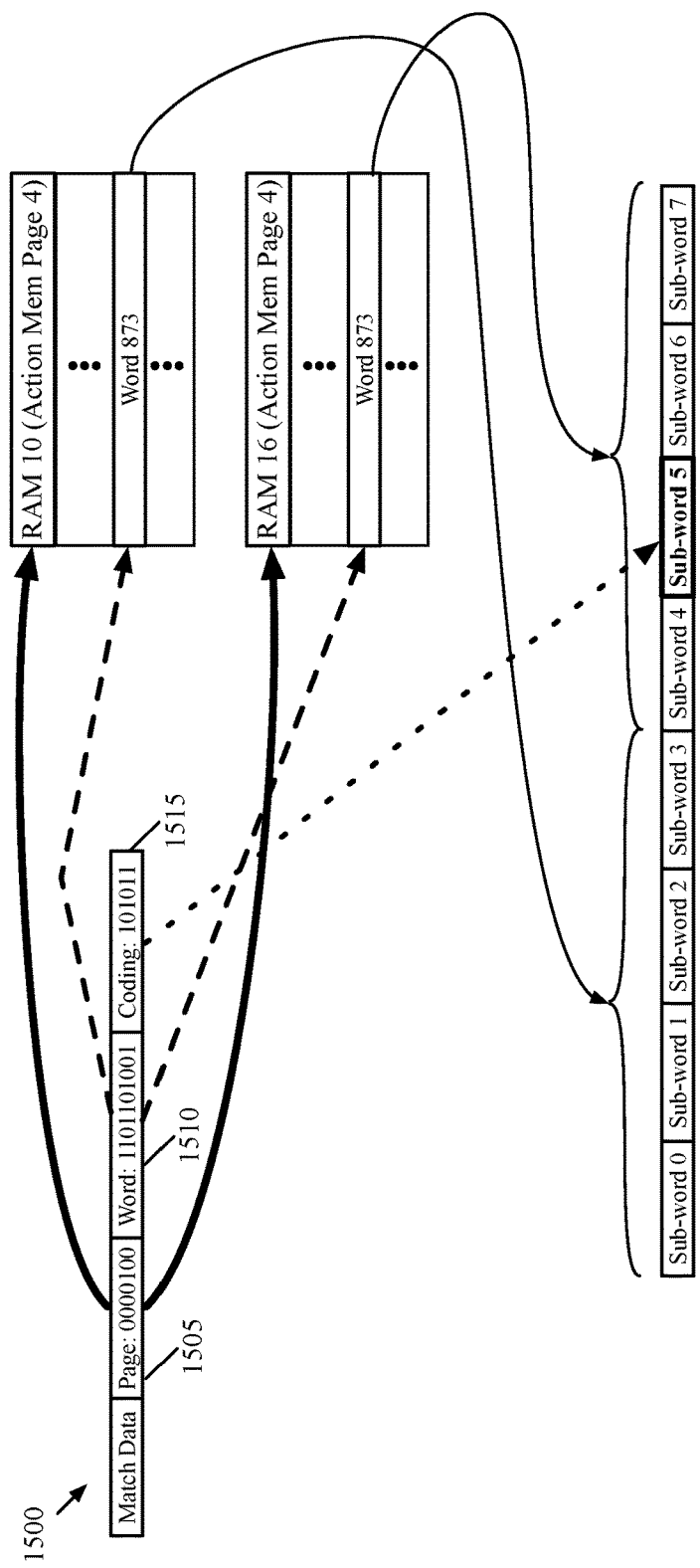
FIGS. 15 and 16 conceptually illustrate examples of match entries that reference action entries in action words divided across multiple virtual memory pages, using the sub-word coding scheme of some embodiments.
Figure 16:
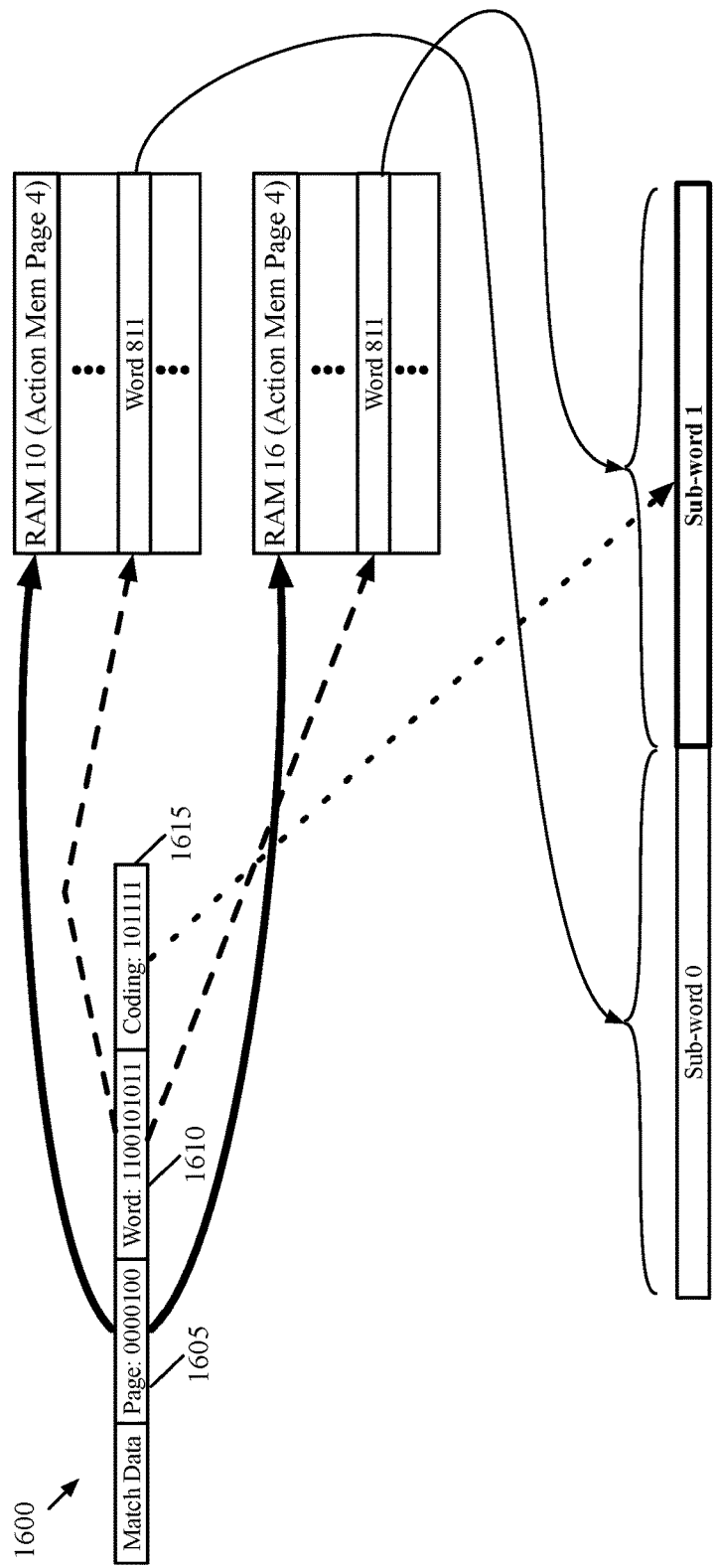

FIGS. 15 and 16 conceptually illustrate examples of match entries that reference action entries in action words divided across multiple virtual memory pages, using the sub-word coding scheme of some embodiments. These entries use different numbers of trailing is in the sub-word address bits in order to reference different length sub-words. As shown in FIG. 15, a match entry 1500 includes match data, a page address 1505, a word address 1510, and a sub-word coding 1515. The action table in this example includes words that are 256 bits wide (assuming 128-bit wide RAMs), and thus each virtual memory page is spread across two unit memories (RAM 10 and RAM 16 in this case). As shown, the page address 1505 requires 7 bits of data in this example, and provides the value 4. The word address 1510 requires 10 bits in this example (for up to 1024 words per page), and gives the value 873.

As both RAM 10 and RAM 16 are configured to respond to page address value 4, the forwarding element (e.g., the ALU) for the current match-action stage reads word 873 from each of these two unit memories to retrieve the action word. The sub-word coding 1515 has an encoding section (the trailing is and first 0) of 011, which implies a sub-word length of 32 bits, and therefore 8 sub-words in the 256-bit action word. This assumes a minimum sub-word length of 8 bits (when the last bit in the coding is 0), and means that the first three bits (101) specify the particular sub-word. In this case, the sub-word selects sub-word 5, which is used for the action entry to modify the packet, specify output actions, etc.

FIG. 16 illustrates a match entry 1600 that also includes match data, a page address 1605, a word address 1610, and a sub-word coding 1615. The action table is the same as in the previous figure, and the page address 1605 again refers to virtual page 4 (unit memories 10 and 16). This time, the word address 1610 refers to word 811, which is read from both of these unit memories. The coding in this example allocates five of the six bits to the sub-word length (01111), indicating a length of 128 bits. This means that the 256-bit word includes only two sub-words of 128 bits. The first bit being a 1, rather than a 0, denotes the second of the two sub-words for the action entry.

III. Virtual Addressing of Match Memories

In addition to using the virtual memory page addresses for the action entries, some embodiments use a similar scheme for the match entries as well. The above description refers to the case in which the match entry specifies the address of the action entry within its data. In some embodiments, however, the match entries (or at least some of the match entries) do not specify the address of the corresponding action entry, but instead use a direct addressing scheme in which the address of the match entry is used for the address of the action entry. That is, a match entry located at location X of unit match memory Y automatically references the action entry located at location X of unit action memory Y.

If only the action entries are moved from one unit memory to another, then this scenario only requires virtual memory page addresses for the sets of action entries. However, some embodiments also move the sets of match entries within the pool of unit memories designated as unit match memories. In this case, such embodiments assign virtual memory page addresses to the sets of match entries as well. Thus, when a set of match entries designated as virtual memory page X move from a first unit memory to a second unit memory, they still reference the same set of action entries.

Figure 17:
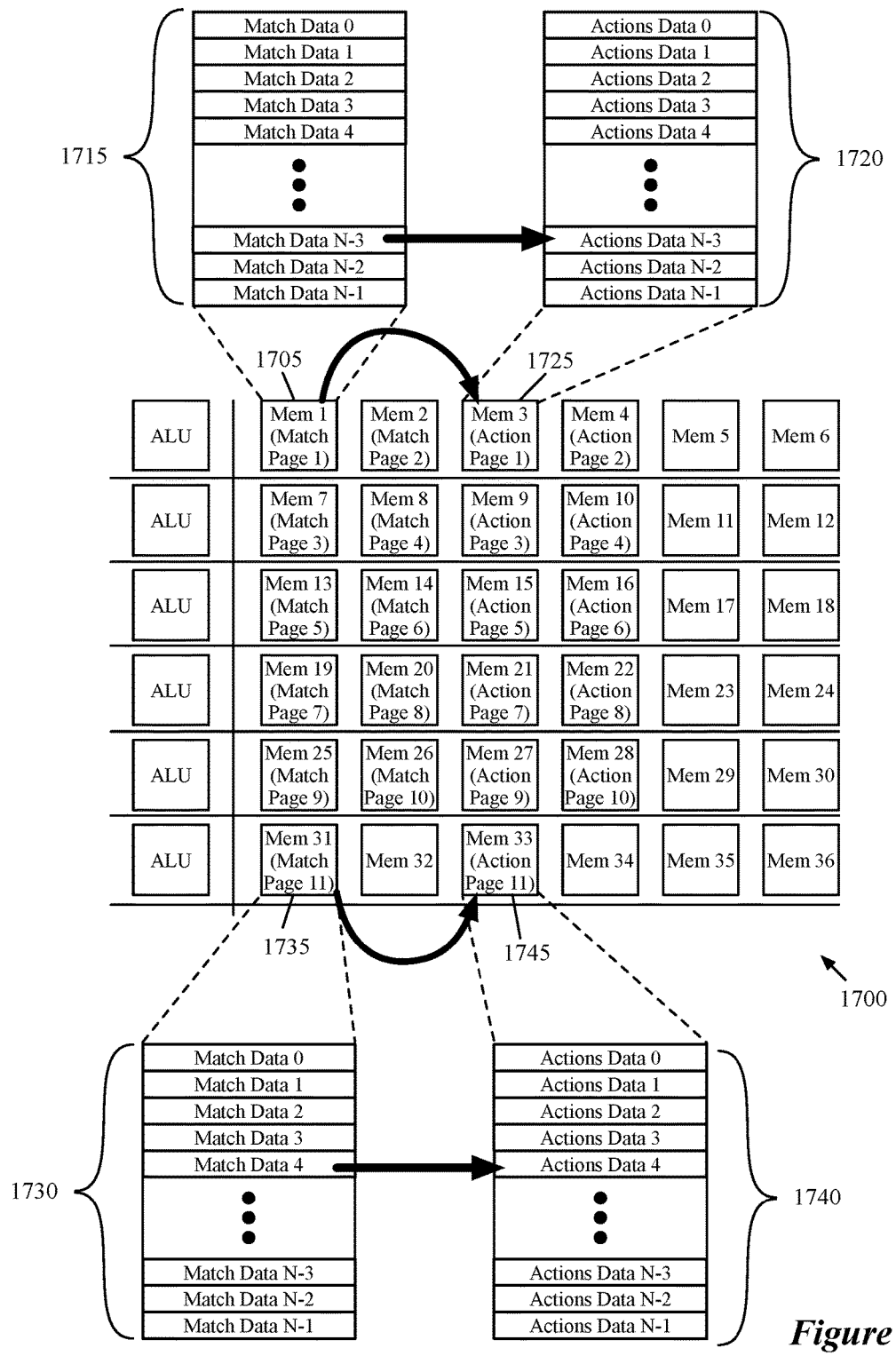
FIG. 17 illustrates a portion of a grid of unit memories that includes both match and action memories with virtual memory pages denoted for both of these types of memories.

FIG. 17 illustrates a portion of a grid 1700 of unit memories that includes both match and action memories with virtual memory pages denoted for both of these types of memories. In this example, the unit memories in the two columns closest to the ALUs are allocated to store match entries. The remainder of the grid 1700 is allocated for all other types of memories, with the action entries shown currently located in the subsequent two columns. As described above, in some embodiments the match and action entries for a particular match stage are located in the same row of unit memories, though some embodiments also use various wiring to enable the distribution of match stages across two or more rows, as described in U.S. Provisional Application 62/108,409.

In this example, both the sets of match entries and sets of action entries that are stored on the unit memories are each assigned a virtual page number. Thus, both the sets of match entries and the sets of action entries have virtual page numbers from 1-11. This enables a direct addressing scheme in which the address of a match entry (including both a virtual page address and a location within the page) is used to determine the address of the action entry to which the match entry refers. In this case, the address of a match entry and its corresponding action entry are the same. However, to avoid using the same memory page numbers for the sets of match and action entries, some embodiments use a scheme with a fixed formula to get the action entry page from a match entry page (e.g., adding 20 to the match entry page, etc.).

The figure illustrates that a first match memory 1705 has N location (e.g., 1000 RAM words), each of which stores a match entry 1715. Whereas in the previous examples each of these match entries included a match data (set of match conditions) portion and an action entry address portion, in this case the match entries only include the set of match conditions. Instead, the forwarding element (e.g., the ALU reading the match data) is configured to know the location of the corresponding action entry based on the location of a match entry. Thus, each of the match entries 1715 in virtual match memory page 1 references one of the action entries 1720 in the same location in virtual action memory page 1, stored on a unit memory 1725. As illustrated by the arrow in this figure, for example, the match entry at location N−3 in unit memory 1705 references the action entry at location N−3 in the unit memory 1725. Similarly, the match entries 1730 in virtual match memory page 11 (currently stored on unit memory 1735) each refer to one of the action entries 1740 in virtual action memory page 11 (currently stored on unit memory 1745). This enables the free movement of both the sets of match entries and the sets of action entries between unit memories, so long as the virtual page address configurations move with the sets of match and/or action entries.

Figure 18:
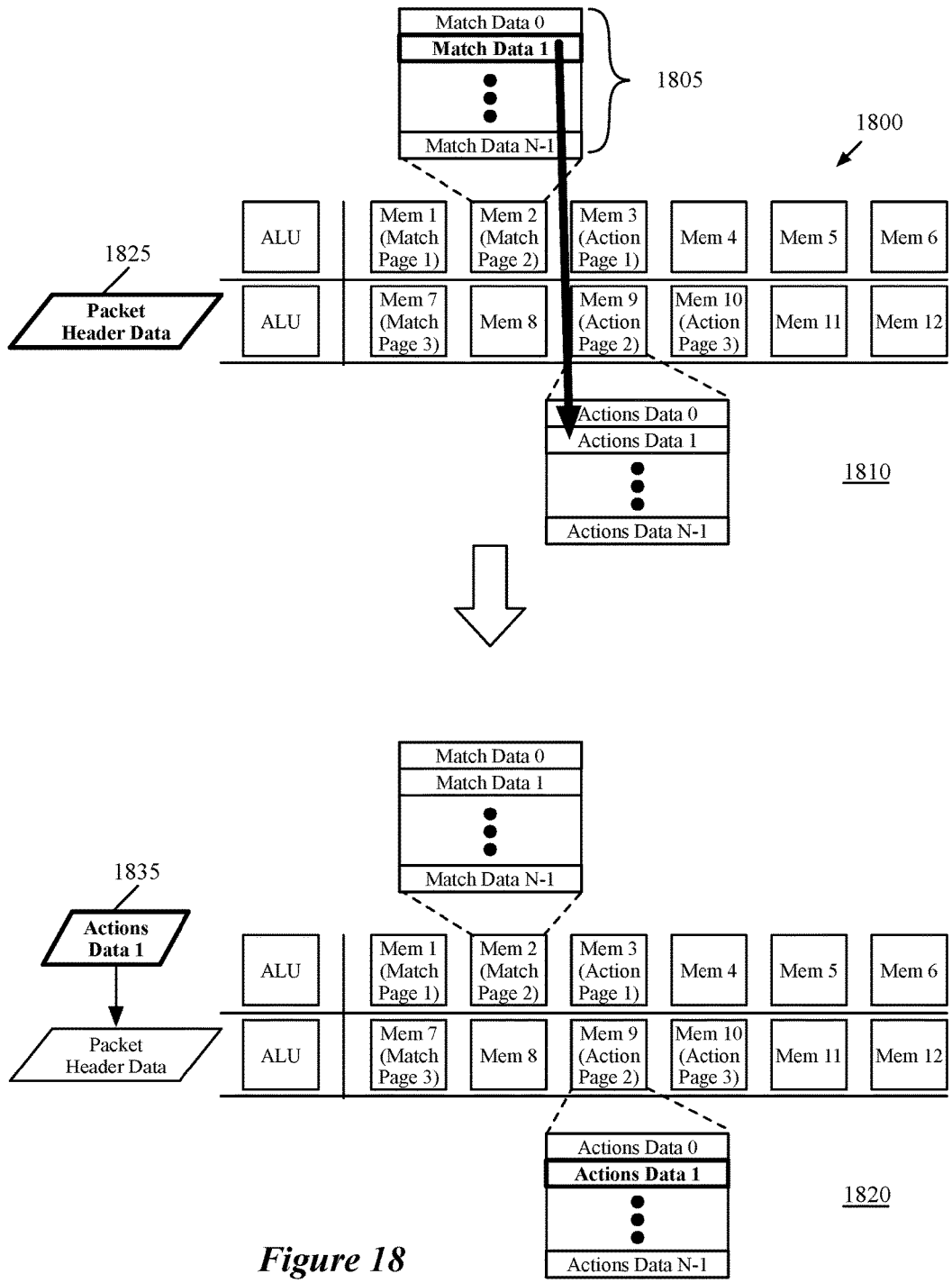
FIGS. 18-20 illustrate the movement of a set of match entries that use a direct addressing scheme to refer to action entries, without consequences on the referencing of the action entries.
Figure 19:
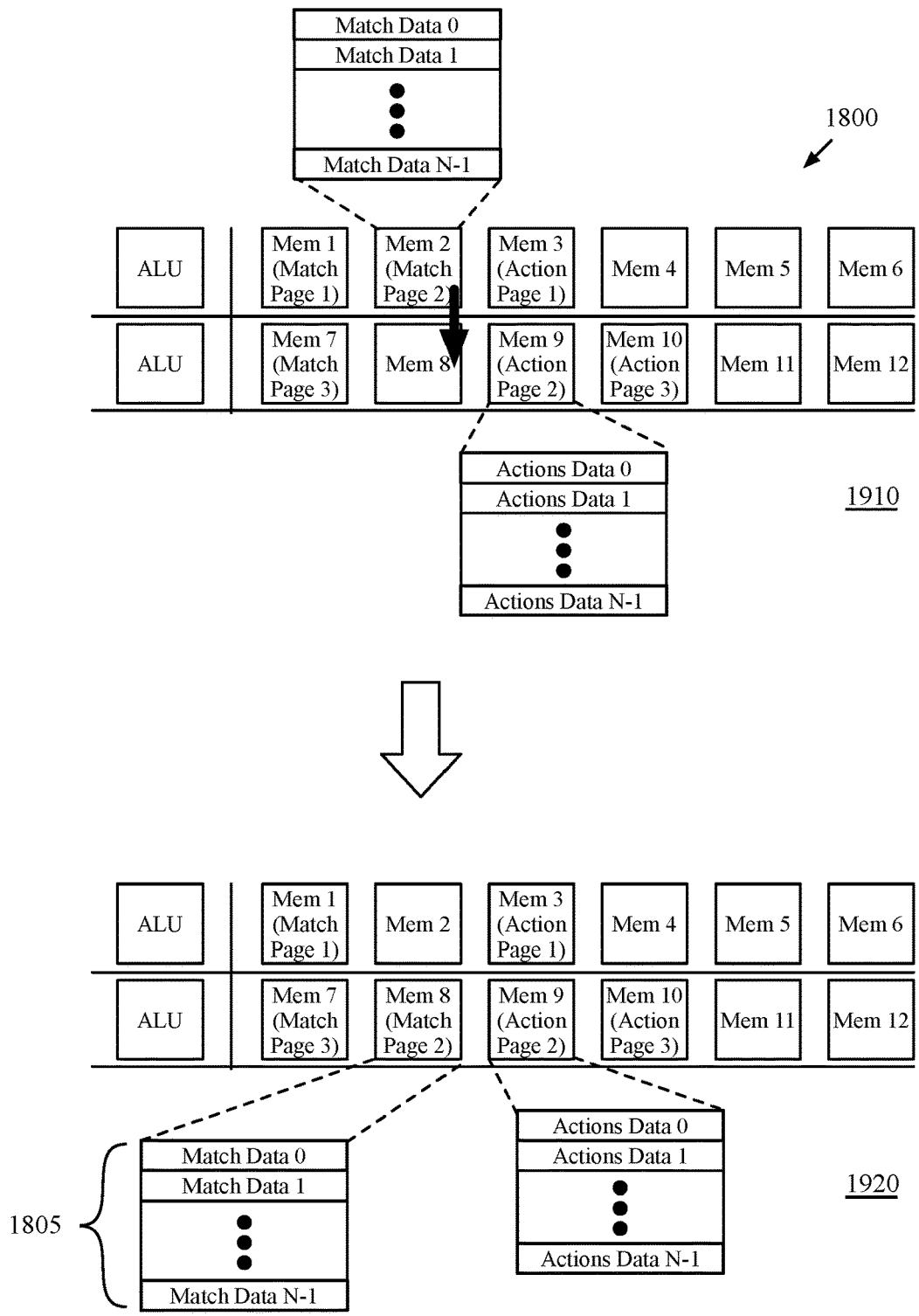
Figure 20:
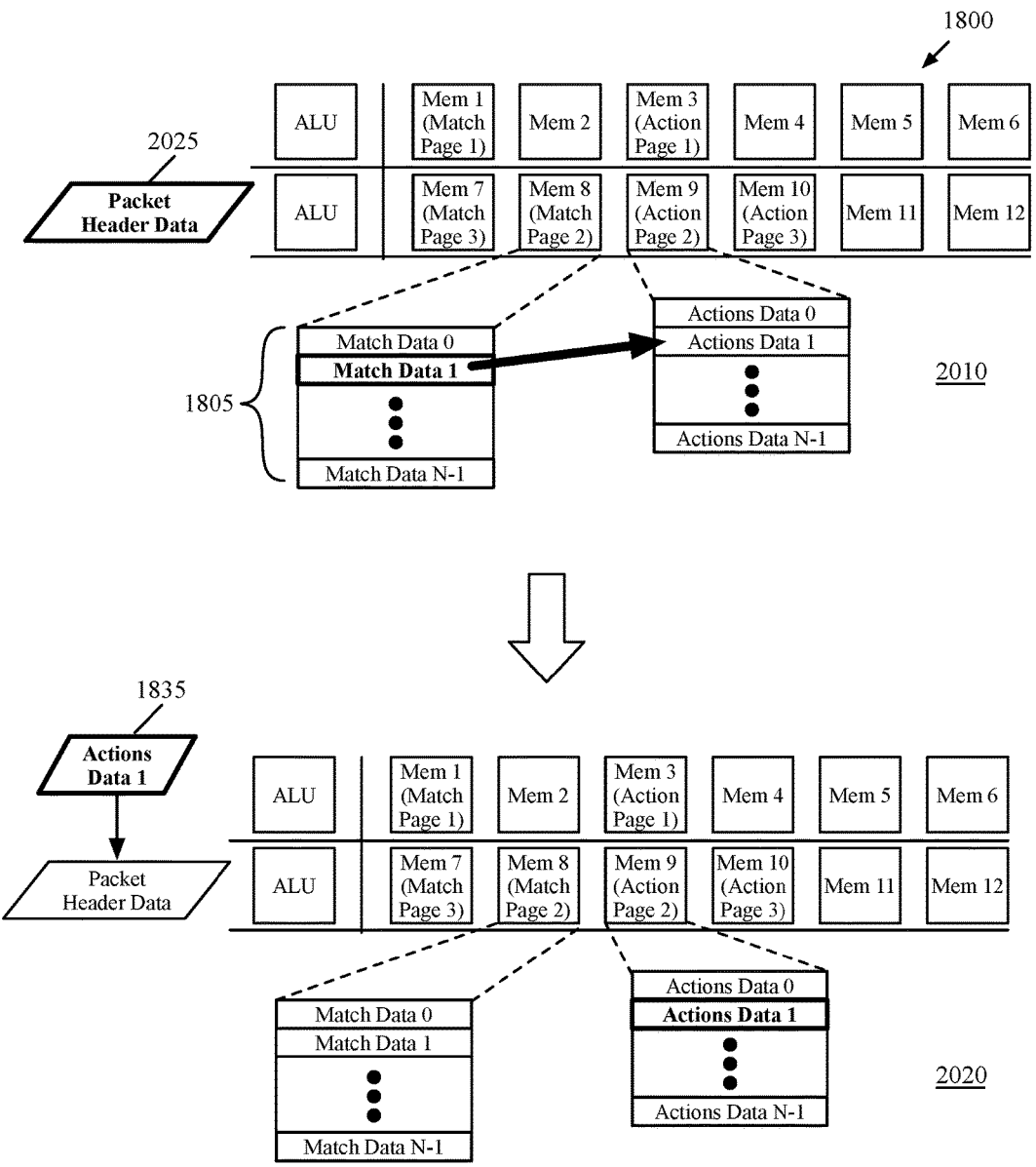

FIGS. 18-20 illustrate the movement of a set of match entries that use a direct addressing scheme to refer to action entries, without consequences on the referencing of the action entries. Specifically, FIG. 18 illustrates a forwarding element matching packet header data against a match table to find a match entry in a first unit memory that references action data in a second unit memory, over two stages 1810 and 1820. The first stage 1810 illustrates a portion of a grid 1800 of unit memories. For the sake of simplicity, only two rows of the grid 1800 are shown in the figure. Three of these unit memories (in the columns closest to the ALUs) are allocated to storing sets of match entries, while another three of the unit memories are allocated to storing sets of action entries.

The sets of match entries are each assigned virtual memory page numbers, as shown in the figure. Specifically, the match entries in unit memory 1 are assigned as match page 1, the match entries in unit memory 2 are assigned as match page 2, and the match entries in unit memory 7 are assigned as match page 3. Similarly, sets of action entries are also assigned virtual memory page numbers, with the action entries in unit memory 3 assigned as action page 1, the action entries in unit memory 9 assigned as action page 2, and the action entries in unit memory 10 assigned as action page 3. As indicated above, some embodiments assign these page numbers by storing configuration data that indicates the virtual page numbers currently associated with the different unit memories in the grid.

Also shown at this stage 1810, the match entries 1805 stored in the virtual match memory page 2 only store their respective sets of match conditions, and do not include a reference address for a corresponding action entry. Instead, these match entries refer to the corresponding action entries through direct addressing, with each match entry at a particular match memory page and location address referring to an action entry located at the same location in a corresponding action memory page address. In this example, each of the match entries refers to an action entry that fits in a single location of a single memory page. However, some embodiments use several bits of the match memory to indicate the number of unit memories across which an action entry is divided (e.g., three bits allowing for up to eight unit memories), thereby enabling a direct addressing scheme to incorporate longer action entries.

In the first stage 1810, packet header data 1825 is submitted against the match table implemented by the match entries 1805 stored in unit memory 2 (the match entries of virtual page 2). In some embodiments, an ALU (e.g., the ALU that shares the row with this match memory) performs the lookup to identify an entry with the data that matches the current packet header data 1825. In this example, the second match entry matches the packet header data 1825. This data, by virtue of the direct addressing scheme, refers to the second action entry in the action memory with the corresponding virtual page number (page number 2).

In the second stage 1820, one of the ALUs reads the action data from the memory location determined based on the location of the match entry identified at the previous stage 1810. As shown, the forwarding element applies the action data 1835 to the packet header data 1825. While in this case the action data specifies modifications to the packet header, in some cases the action entry could specify other types of actions to take, such as modifying the meters or statistics data, dropping the packet, outputting the packet, etc.

FIG. 19 illustrates the movement of the set of match entries 1805 from one unit memory to another in the grid 1800. Specifically, the set of match entries are moved from the unit memory 2 to the unit memory 8 over two stages 1910 and 1920, while keeping their virtual page number. As shown in the first stage 1810, the memory grid receives instructions (e.g., configuration data from a memory controller) to move the match data stored in unit memory 2 to the unit memory 8. This move might be performed to accommodate the movement of different data (other match data, action data, etc.) into the unit memory 8. For instance, the U.S. Provisional Application 62/108,409, incorporated by reference above, describes various reasons for the movement of data between unit memories.

In the second stage 1920, the match entries 1805 have now been moved to the new unit memory 8 (e.g., using the process described above by reference to FIG. 9). As shown at this stage, virtual match memory page 2 is now associated with the unit memory 8 (e.g., by updating configuration data for the memory grid), while the match and action entries themselves remain unchanged.

FIG. 20 illustrates, over two stages 2010 and 2020, the forwarding element matching packet header data 2025 for a new packet with the same header field values as the packet header data 1825, after the match entries 1805 have moved to the new unit memory. In the first stage 2010, the packet header data 2025 is submitted against the match table implemented by the match entries 1805, now located in unit memory 8. In this example, the second match entry (match data 1) matches the packet header data 2025, as the packet data is the same as in FIG. 18.

The unmodified match entry still has an address of location 1 of virtual match memory page 2. As such, the configuration data for the memory grid 2000 still identifies that the corresponding virtual action memory page 2 corresponds to unit memory 9 in the grid. As such, in the second stage 2020, one of the ALUs reads the action data from this corresponding memory location. As shown, the forwarding element applies the action data 1835 to the packet header data 2025.

In some embodiments, the match entries may be small enough such that multiple entries fit within a single location of one of the unit memories. For example, a standard MAC address uses 48 bits, and thus two such addresses can fit within a 128-bit memory location (so long as the overhead is not too large). Packing multiple match entries per unit memory location is easier using the direct addressing scheme, in which additional bits need not be allocated per match entry to the corresponding action entry address. However, for the indirect addressing scheme to work, some embodiments assign multiple virtual memory page addresses to each unit memory. In the example of 48-bit MAC addresses, the first half of all of the locations in the unit memory are part of a first virtual memory page and the second half of all of the locations in the unit memory are part of a second virtual memory page.

Figure 21:
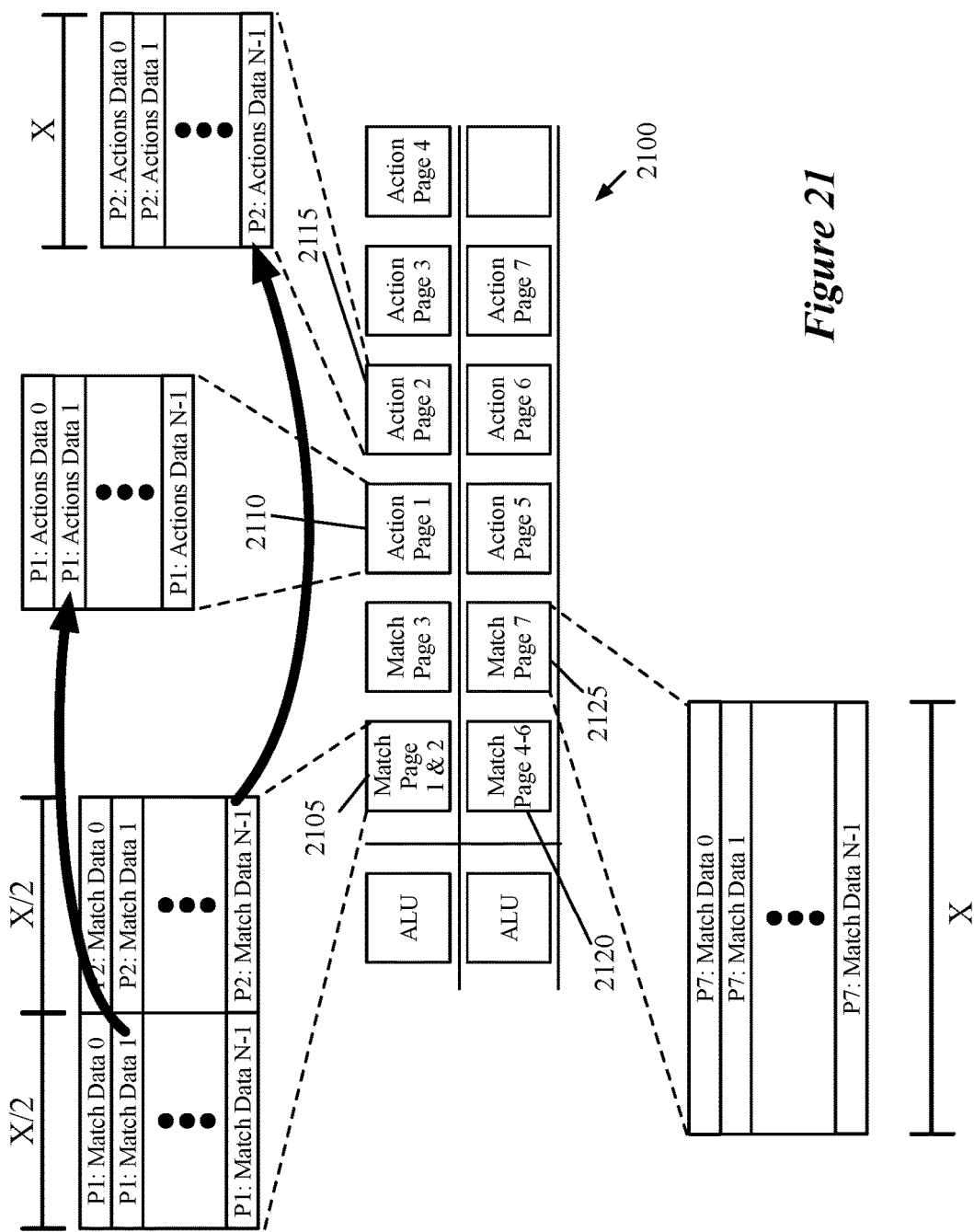
FIG. 21 illustrates an example of a portion of a grid of unit memories, in which some of the match memories store multiple pages of match entries.

FIG. 21 illustrates an example of a portion of a grid 2100 of unit memories, in which some of the match memories store multiple pages of match entries. In this example, the first two columns store match entries while the remainder of the columns store other data, primarily action entries. Specifically, the configuration of these unit memories fits multiple virtual match memory pages into a single unit memory, while maintaining the direct addressing scheme shown in the previous figures of this section.

For example, the first unit memory 2105 allocated to match entries stores two virtual memory pages assigned virtual page numbers 1 and 2. As shown in the figure, the unit memories have a width of X bits (e.g., 128 bits). For unit memory 2105, the first X/2 bits are allocated to a first set of match entries and the second X/2 bits are allocated to a second set of match entries. The second set of match entries could be a continuation of the table from the first match page or a completely separate table, in different embodiments. For instance, a table with 2000 different MAC addresses could be arranged with the first 1000 MAC addresses in virtual page 1, occupying the first 48 bits (plus any overhead) of each location in the unit memory, while the second 1000 MAC addresses occupy the 48 bits starting from the halfway point of the width (e.g., starting with the $65^{th}$ bit in a 128-bit unit memory). In the example shown in the figure, the entries stored in the "left" X/2 bits refer (through a direct addressing scheme) to the action entries in virtual action memory page 1 stored in one unit memory 2110, while the entries stored in the "right" X/2 bits refer to the action entries in virtual action memory page 2 stored in a different unit memory 2115.

In some embodiments, all of the match entries in a table (and thus all of the entries in a particular virtual page) are formatted in the same way. However, some embodiments would allow the first virtual page of a unit memory to have a first format (e.g., matching over MAC addresses) while the second virtual page of the same unit memory has a second, different format (e.g., matching over IP addresses).

This figure also illustrates that different unit memories may be divided into different numbers of virtual match memory pages, depending on the size of the match entries. For example, the unit memory 2120 stores three virtual match memory pages 4-6 (e.g., for matching over IPv4 addresses), whereas the unit memory 2125 stores a single virtual memory page (e.g., matching over a larger set of data, such as a VLAN tag/MAC address combination). In this case, the action memories also each have full-width entries (the width of the entries in the figure is not drawn to scale).

Figure 22:
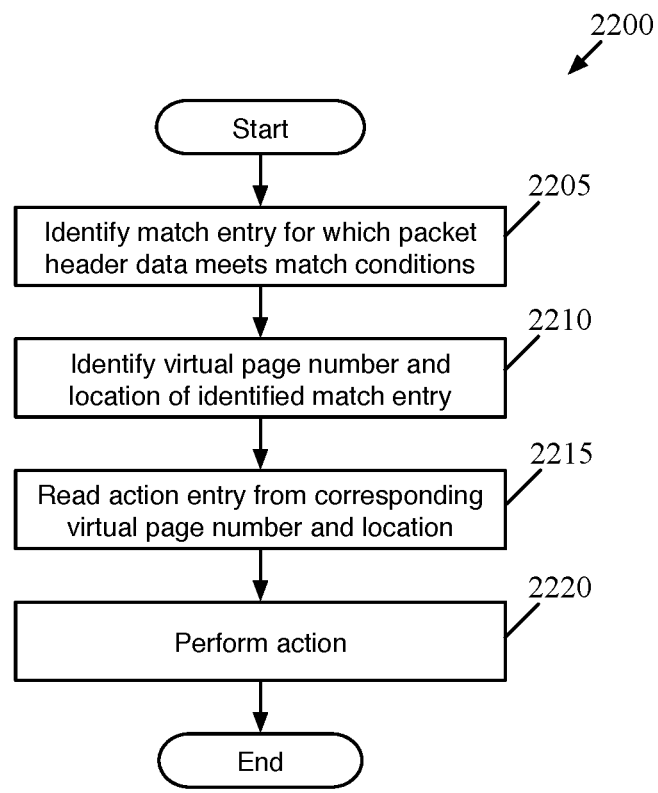
FIG. 22 conceptually illustrates a process of some embodiments for implementing a flow table at a forwarding element using direct addressing.

FIG. 22 conceptually illustrates a process 2200 performed by a forwarding element that implements flow tables using direct addressing according to some embodiments. Specifically, the process 2200 shows the operations performed by the forwarding element of some embodiments to match a packet against the match memory (or memories) that store the match conditions for a flow table and to subsequently read action data from an action memory (or memories) that indicate the actions to perform for a match entry matched by the packet. This process uses the direct addressing scheme described in this section, in which the address of the action entry is determined based on the address of the corresponding match entry.

As shown, the process 2200 begins by identifying (at 2205) a match entry within a particular flow table for which a set of packet header data meets the match conditions. In some embodiments, as described above, packet header data (sets of packet header field values, as well as additional values not technically part of a packet as sent on the wire, such as the ingress port on which the packet was received) is submitted to a series of match-action tables (also called flow tables). The flow entries of a flow table are stored in multiple unit memories, with the match conditions for the different table entries stored in one unit memory (or multiple unit memories) and the actions to perform stored in a different unit memory (or multiple memories). In some embodiments, circuitry in the forwarding element identifies a match entry having the match conditions that is met by the packet data by performing content addressable lookup or by scanning through the match entries in the appropriate match memory.

The process then identifies (at 2210) the virtual page number and the location within that virtual page of the identified match entry. As noted, the match entries do not include within their data the address of the corresponding action entries. Instead, the action entry address is determined based on the page number and location of the identified match entry. As described, the virtual page number is associated with a set of match entries, and thus with the unit memory (or a portion of the unit memory locations) on which the set of match entries are stored. To implement this function, some embodiments store configuration data that indicates the virtual page address for each unit memory, or portion of unit memory.

Next, the process 2200 reads (at 2215) the action entry from the corresponding virtual page number and location of an action memory page. In some embodiments, the address of the action entry has the same virtual page number as the virtual page number of the identified match entry. In other embodiments, configuration data specifies how to arrive at the virtual page number of an action entry based on the virtual page number of a corresponding match entry (e.g., by adding a constant value). The location within the virtual action memory page is the same as the location within the virtual match memory page of the identified match entry, in some embodiments.

In some embodiments, the ALU performing the read operation broadcasts the desired virtual page number to the unit memories in the appropriate grid or portion of the grid, and the memory configured with the broadcasted virtual page number provides the data from the requested memory location. When multiple page numbers are needed, the ALU broadcasts multiple virtual page numbers and reads the data from each of the corresponding memories. Finally, the process performs (at 2220) the action or actions specified by the one or more action entries, then ends. These actions may include modifying packet header values (e.g., changing IP addresses for NAT operations, changing MAC addresses for routing operations, adding or removing VLAN tags, applying a tunnel encapsulation, etc.), dropping a packet, outputting a packet to a specified port, modifying statistics or meters, etc.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 23 conceptually illustrates an electronic system 2300 with which some embodiments of the invention are implemented. The electronic system 2300 can be used to execute any of the control, virtualization, or operating system applications described above. The electronic system 2300 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2300 includes a bus 2305, processing unit(s) 2310, a system memory 2325, a read-only memory 2330, a permanent storage device 2335, input devices 2340, and output devices 2345.

The bus 2305 collectively represents all system, peripheral, and chipset buses that communicatively connect the numerous internal devices of the electronic system 2300. For instance, the bus 2305 communicatively connects the processing unit(s) 2310 with the read-only memory 2330, the system memory 2325, and the permanent storage device 2335.

From these various unit memories, the processing unit(s) 2310 retrieve instructions to execute and data to process in order to execute the processes of the invention. The processing unit(s) may be a single processor or a multi-core processor in different embodiments.

The read-only-memory (ROM) 2330 stores static data and instructions that are needed by the processing unit(s) 2310 and other modules of the electronic system. The permanent storage device 2335, on the other hand, is a read-and-write memory device. This device is a non-volatile unit memory that stores instructions and data even when the electronic system 2300 is off. Some embodiments of the invention use a mass-storage device (such as a magnetic or optical disk and its corresponding disk drive) as the permanent storage device 2335.

Other embodiments use a removable storage device (such as a floppy disk, flash drive, etc.) as the permanent storage device. Like the permanent storage device 2335, the system memory 2325 is a read-and-write memory device. However, unlike storage device 2335, the system memory is a volatile read-and-write memory, such a random access memory. The system memory stores some of the instructions and data that the processor needs at runtime. In some embodiments, the invention's processes are stored in the system memory 2325, the permanent storage device 2335, and/or the read-only memory 2330. From these various unit memories, the processing unit(s) 2310 retrieve instructions to execute and data to process in order to execute the processes of some embodiments.

The bus 2305 also connects to the input and output devices 2340 and 2345. The input devices enable the user to communicate information and select commands to the electronic system. The input devices 2340 include alphanumeric keyboards and pointing devices (also called "cursor control devices"). The output devices 2345 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 23, bus 2305 also couples electronic system 2300 to a network 2365 through a network adapter (not shown). In this manner, the computer can be a part of a network of computers (such as a local area network ("LAN"), a wide area network ("WAN"), or an Intranet, or a network of networks, such as the Internet. Any or all components of electronic system 2300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 8 and 22) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A non-transitory machine readable medium storing a program for configuring a plurality of unit memories to implement first and second sets of entries, wherein the second set of entries references the first set of entries, the program for execution by at least one processor, the program comprising sets of instructions for:
    configuring a first pool of unit memories to implement the first set of entries, wherein each entry in the first set is located at a particular location in at least one of the unit memories of the first pool;
    configuring a second pool of unit memories to implement the second set of entries, wherein each entry in the second set comprises a particular number of bits for indicating (i) an initial unit memory in the first pool of unit memories at which the entry of the first set referenced by the entry of the second set is found and (ii) a number of subsequent unit memories in the first pool across which the entry of the first set is divided, wherein a number of bits required to identify a single unit memory in the first pool is one fewer than the particular number of bits,
    wherein the unit memories are components of a hardware forwarding element for forwarding packets in a network.

2. The non-transitory machine readable medium of claim 1, wherein the number of subsequent memories across which a particular entry in the first set is divided is an arbitrary power of two.

3. The non-transitory machine readable medium of claim 1, wherein a first entry of the first set of entries is divided across one unit memory, and a second entry of the first set of entries is divided across two unit memories.

4. The non-transitory machine readable medium of claim 3, wherein a third entry of the first set of entries is divided across four unit memories.

5. The non-transitory machine readable medium of claim 4, wherein the same particular number of bits is used to indicate the initial unit memory and the number of subsequent unit memories across which each of the first, second, and third entries are divided.

6. The non-transitory machine readable medium of claim 1, wherein the particular number of bits is a first particular number of bits and each entry in the second set of entries comprises a second particular number of bits that indicates a location in each indicated unit memory of the first pool at which the referenced entry of the second set is found.

7. The non-transitory machine readable medium of claim 1, wherein the first set of entries comprises action entries and the second set of entries comprises match entries, wherein each match entry comprises a set of match conditions and an address for an action entry to read when the match conditions are met by a packet.

8. The non-transitory machine readable medium of claim 7, wherein each action entry specifies a set of actions to apply to the packet when the set of match conditions of the match entry that references the action entry are met.

9. The non-transitory machine readable medium of claim 1, wherein the particular number of bits comprises 8 bits, and 7 bits are required to specify any one of the unit memories in the first pool of unit memories.

10. The non-transitory machine readable medium of claim 1, wherein each entry of the second set further comprises a second particular number of bits for indicating a specific location within the unit memories in the first pool across which the entry of the first set referenced by the entry of the second set is located.

11. The non-transitory machine readable medium of claim 6, wherein the location is a same location in each of the indicated unit memories of the first pool.

12. The non-transitory machine readable medium of claim 1, wherein:
    the second pool of unit memories implements match entries for a first packet processing stage of the hardware forwarding element and the first pool of unit memories implements corresponding action entries for the first packet processing stage;
    a third pool of unit memories implements match entries for a second packet processing stage of the hardware forwarding element; and
    a fourth pool of unit memories implements corresponding action entries for the second packet processing stage.

13. The non-transitory machine readable medium of claim 1, wherein the program further comprises a set of instructions for moving a subset of the first set of entries from a first unit memory of the first pool to a second unit memory of the first pool.

14. The non-transitory machine readable medium of claim 13, wherein the entries of the second set of entries are not modified when the subset of the first set of entries are moved.

15. The non-transitory machine readable medium of claim 1, wherein the program further comprises a set of instructions for moving a subset of the second set of entries from a first unit memory of the second pool to a second unit memory of the second pool.

* * * * *